United States Patent
Lavallee et al.

(10) Patent No.: US 7,003,527 B1
(45) Date of Patent: Feb. 21, 2006

(54) METHODS AND APPARATUS FOR MANAGING DEVICES WITHIN STORAGE AREA NETWORKS

(75) Inventors: James Edward Lavallee, Boylston, MA (US); Alex Dubrovsky, Westborough, MA (US); Kevin M. Ligozio, Alexandria, VA (US); Anthony Michael Fiorentino, Leominster, MA (US); Yifeng Chen, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 524 days.

(21) Appl. No.: 10/186,250

(22) Filed: Jun. 27, 2002

(51) Int. Cl.
*G06F 17/30* (2006.01)

(52) U.S. Cl. ............. 707/102; 707/10; 707/200; 709/203

(58) Field of Classification Search .............. 707/8, 707/10, 102, 200; 709/203, 207, 220, 223, 709/224, 227, 230, 246; 711/148; 715/733, 715/734, 740, 771; 719/203, 217, 219, 310
See application file for complete search history.

(56) References Cited

U.S. PATENT DOCUMENTS

| | | | |
|---|---|---|---|
| 5,442,791 A * | 8/1995 | Wrabetz et al. ............. 719/330 |
| 5,586,117 A * | 12/1996 | Edem et al. ................. 370/466 |
| 5,621,892 A * | 4/1997 | Cook .......................... 709/224 |
| 5,909,550 A * | 6/1999 | Shankar et al. ............. 709/227 |
| 5,966,707 A * | 10/1999 | Van Huben et al. .......... 707/10 |
| 5,999,179 A * | 12/1999 | Kekic et al. ................. 715/734 |
| 6,085,236 A * | 7/2000 | Lea ............................. 709/220 |
| 6,256,678 B1 * | 7/2001 | Traughber et al. .......... 719/310 |
| 6,260,062 B1 * | 7/2001 | Davis et al. ................. 709/223 |
| 6,327,594 B1 * | 12/2001 | Van Huben et al. ........ 707/200 |
| 6,377,988 B1 | 4/2002 | Spector et al. ............... 709/224 |
| 6,389,129 B1 * | 5/2002 | Cowan .................... 379/221.03 |
| 6,480,901 B1 * | 11/2002 | Weber et al. ................ 709/246 |
| 6,516,356 B1 * | 2/2003 | Belknap et al. ............. 719/328 |
| 6,606,690 B1 * | 8/2003 | Padovano .................... 711/148 |
| 6,640,278 B1 | 10/2003 | Nolan et al. .................... 711/6 |

(Continued)

OTHER PUBLICATIONS

Reese, George, "Database programming with JDBC and Java," O'Reilly, ©1997, 1st Ed.*

*Primary Examiner*—Jeffrey Gaffin
*Assistant Examiner*—Hassan Mahmoudi
(74) *Attorney, Agent, or Firm*—Chapin & Huang, LLC; Barry W. Chapin, Esq.

(57) ABSTRACT

Mechanisms and techniques provide a management application providing an enterprise storage area network application programming interface for managing elements in a storage area network. The management application initializes a plurality of access wrappers that each defines operations for management of a respective class of elements operating within the storage area network. The management application provides, to a management client, connection data associated with a specific element associated with one of the plurality of access wrappers. The connection data identifies connection data parameters for performing management of the specific element in the storage area network. The management application receives at least one generic management command for the specific element. The generic management command includes at least a portion of the associated connection data for the specific element. The management application operates at least one access wrapper to translate the at least one generic management command into an operation of at least one vendor-specific command to manage the vendor specific element in the storage area network.

34 Claims, 12 Drawing Sheets

U.S. PATENT DOCUMENTS

| | | |
|---|---|---|
| 6,664,978 B1 * | 12/2003 | Kekic et al. ............... 709/203 |
| 6,785,730 B1 * | 8/2004 | Taylor ...................... 709/230 |
| 2001/0047482 A1 * | 11/2001 | Harris et al. ............... 713/200 |
| 2002/0036794 A1 * | 3/2002 | Boehmer et al. .......... 358/1.15 |
| 2002/0059425 A1 * | 5/2002 | Belfiore et al. ............ 709/226 |
| 2002/0069369 A1 * | 6/2002 | Tremain .................... 713/201 |
| 2002/0129136 A1 * | 9/2002 | Matharu .................... 709/223 |
| 2002/0133581 A1 * | 9/2002 | Schwartz et al. .......... 709/223 |
| 2002/0156984 A1 * | 10/2002 | Padovano .................. 711/148 |
| 2002/0184352 A1 * | 12/2002 | Jain et al. .................. 709/223 |
| 2003/0115218 A1 * | 6/2003 | Bobbitt et al. ............. 707/200 |
| 2003/0126195 A1 * | 7/2003 | Reynolds et al. .......... 709/203 |

* cited by examiner

ESTABLISHING INTERFACE HANDLES

CONNECTION DATA OPERATION

METHODS AND APPARATUS FOR MANAGING DEVICES WITHIN STORAGE AREA NETWORKS

FIELD OF THE INVENTION

The present invention generally relates to systems for managing devices within a storage area network, and more particularly, to a management application that incorporates an application programming interface for managing functional aspects of elements operating within a storage area network.

BACKGROUND OF THE INVENTION

The rapid expansion of information service and data processing industries has resulted in a need for computer systems to manage and store large amounts of data. As an example, financial service businesses such as banks, mutual fund companies or the like often operate large and complex data processing systems that require access to many hundreds of gigabytes or even terabytes of data. Data storage system developers have responded to these types of data storage requirements by integrating large capacity data storage systems into networks called "storage networks" or "storage area networks" (SANs.) A storage area network is a collection of data storage systems that are networked with each other and with a number of computer systems that operate as servers to serve data stored in the data storage systems to end-user or host computer systems. In a typical implementation, a storage area network includes elements such as one or more connectivity devices, such as high speed data switches, that interconnect the various data storage systems to each other and to one or more of the server and host computer systems (servers and hosts) that require access to (e.g., read and/or write) the data in the data storage systems. As the servers and hosts request access (e.g., read and/or write) to the data, the data switches channel the data access requests (e.g., data read requests, data write requests) and responses between the computer system and the appropriate data storage systems within the storage area network. Other elements such as bridges and software applications may operate in the various devices to comprise a storage area network.

Typically, a network management station (i.e., a management computer system) also operates within a storage area network. Generally, a storage area network administrator operates the network management station to remotely manage and control the elements that form the storage area network such as the servers, data switches, and data storage systems. To do so, a conventional network management station operates various remote management software applications in order to remotely control, monitor, manage and configure the various operations (e.g., processes) performed by elements (e.g., devices and/or software processes) operating in the storage area network. By way of example, a storage area network administrator can operate one management application provided form one vendor on the management station to remotely configure disks within a data storage system produced by that vendor. Another management application from another vendor can operate to control backup devices within the storage area network manufactured by that vendor. Still another conventional management application might allow a network manager to configure allocations of storage network resources (e.g., one or more data storage volumes) to specific hosts or groups of host computer systems (e.g., servers or other computer systems that require access to data in the storage network) using a technology called "zoning." Storage area network elements that a zoning management application came configure into zones include, among other things, disk partitions, volume configurations, and access control mechanisms within the data storage systems and the data switches. In this manner, a systems or network manager is able to remotely manage the various elements in a conventional storage area network using conventional management applications produced by various vendors.

SUMMARY OF THE INVENTION

Though management capability is a common characteristic in storage area network elements (e.g., data switches, data storage systems, host bus adapters and the like) made by different manufacturers or vendors, the commands and interfaces used to control management within a particular vendor's equipment are often specific to that vendor. As a specific example, commands used to control zoning within a data switch for use in storage area networks manufactured by a vendor such as IBM Corporation might differ from commands used to control zoning within a data switch for use in storage area networks manufactured by a vendor such as EMC Corporation. Other storage area network manufactures and vendors such as Brocade Communications Incorporated, Hitachi Data Systems, Inc., Mercury Computer Systems, Inc., and so forth might each provide a set of zoning control and configuration commands that differ from each other for devices manufactured by those respective vendors. These vendor specific management commands and operations are typically implemented within vendor supplied and vendor specific management software applications. Such conventional vendor-specific management applications cannot effectively control management in devices made by other vendors. This may be problematic if a customer desires to use storage network equipment made by different manufacturers within the same storage network.

Considering the zoning example presented above, if a customer uses a data switch from IBM and another data switch from Hitachi Data Systems in the same storage area network, various problems might arise when that customer attempts to configure zoning within each of these different data switches using the same zoning management application. Such attempts might not even be possible. Each data switch may require that a network manager perform zoning configuration and control using zoning commands designed and developed by the specific manufacturer of the switch, as implemented only within that manufacturer's storage network management software. As such, the network administrator might be required to operate two different storage network management software applications to control zoning in each switch. One storage network management application might be provided from IBM to provide proper control of zoning in the IBM data switch, and another storage network management application might be provided from Hitachi Data Systems to properly control zoning in the Hitachi data switch. This results in the network manager having to install two different management applications to essentially perform the same functionality, that being zoning control and management.

In addition, another problem presented by conventional storage area network management techniques and mechanisms is that each vendor-specific network management application might have a different user interface and each may operate quite differently from the other. Each management application might also require the customer to have knowledge of different operational procedures and may require separate payments of software licensing fees. Generally, overhead increases if a customer must install, maintain, learn and operate different storage area network management applications from different manufacturers in order to manage, configure and control different storage area network equipment installed in the same storage area network.

The present invention significantly overcomes these and other issues concerning the incompatibilities and difficulties encountered when a network administrator desires to use storage area networking equipment from different vendors or manufacturers in the same storage area network. More specifically, the present invention provides mechanisms and techniques that provide a management station which includes a management application that operates in application programming interface designed for universal management and control of elements (e.g., devices, programs, adapters, etc.) manufactured or provided from different vendors within a storage area network. As noted above, current conventional management techniques for storage area networks rely on a varied set of non-integrated vendor-specific tools to manage a heterogeneous enterprise-wide storage area network. Most conventional tools provide very different interfaces to control the various vendor-specific elements for which they are designed. In contrast, embodiments of the invention provide an enterprise storage area network management application containing a unified application programming interface implemented, for example, as a C library interface, that provides a set of uniform or generic management commands as function calls with a common management application programming interface. The function calls provided from management clients (e.g., graphical user interfaces driven management program) can be sent to the management application of embodiments of this invention, regardless of actual equipment vendor and type of elements installed within the storage area network. Embodiments of the invention provide generic functional interfaces for access by management clients in generic classes or functional areas of storage area network management including, but not limited to, discovery of vendor specific elements and functionality in a storage area network, performance and health monitoring of storage area network elements, storage device masking (e.g., volume and data storage system management), input-output path management, fault management, zoning control, simple network management protocol (SNMP) operations, switch management and data storage device backup management.

As a result of the architecture of embodiments of the present invention, management application functionality can be changed to add new generic interfaces as needed without effecting management client implementations. As a result, if a particular vendor desires to produce a management client which interoperates with a management application configured in accordance with embodiments of the invention, changes to the operation of underlying storage area network elements (e.g., an addition or change to the management interface) produced by the same or by different vendors can be incorporated into the management application configured in accordance with embodiments of the invention without modifying the management client. In other words, a vendor only needs to change the code of a management client when they are ready to do so to take advantage of new features. In addition, if a vendor supplies a new library for management of a previously existing and installed vendor element (e.g., device), embodiments of the invention do not require modification to the generic management calling interface to implement the changes (e.g., a bug fix) within the shared vendor-specific element library. Embodiments of the invention thus provide a backwards compatible storage area network application programming interface capable of managing multiple types of elements produced by multiple vendors and changes in management aspects of particular vendor elements within the storage area network are insulated from management clients. Accordingly, management clients produced from a particular vendor will not break (i.e., crash) upon new releases of management functionality associated with specific vendor elements.

In addition, due to the design and architecture of the application programming interface provided by the embodiments of the invention as explained herein, embodiments allow for the existence of "unpublished" interface functionality by not providing identifiers (e.g., handles, as will be explained) for hidden interfaces. In this manner, embodiments of the invention can provide alternative management techniques in a non-published or none-advertised format for access in a restricted manner for those applications (i.e., custom management programs) to be aware of such unpublished interfaces.

More specifically, embodiments of the invention provide mechanisms and techniques for managing components in a storage area network. The software architecture that provides the application programming interface within embodiments of the invention includes a plurality of functional components. Each functional component represents a class of management functionality related to a class or type of device or process that operates within a storage area networking environment. As an example, one embodiment of the invention provides separate functional components for zoning control, discovery of storage area network manageable elements, storage device masking, statistics collection and performance monitoring, and other tasks. Each functional component provides a set of generic functional interface calls that relate to the generic class of operations that may be performed for management of the class of elements (e.g., devices) corresponding to that functional component. As an example, the zoning functional components exports, for use by management clients, a set of generic zoning management and control commands that are not particular to any one vendor device but that generally control zoning operations such as the creation, modification and removal of zones within a storage area network.

One functional component, called the master functional component, implements a group of specialized management interfaces. These specialized management interfaces within the master functional component implement functionality for i) initialization of elements operating in the storage area network, ii) management of distribution of identities (i.e., handles) of various vendor-specific elements, and iii) management of required access control data, called connection data, which may be required by a management client to establish a connection between the management client and a particular element (e.g., device or software program) operating within the storage area network that is to be managed by that client.

In addition to the functional components, the architecture of embodiments of the invention provides a plurality of access wrapper components. Each access wrapper components generally operates as a translator to translate one or more of the generic management commands received by a particular functional component into vendor specific commands which are passed to vendor specific libraries in order to manage the specific element to which the generic management command is directed. In one example embodiment of the invention, the master functional component operates an initialization procedure which causes the access wrapper components to load and initialize any vendor specific access wrapper libraries (e.g., shared dynamically linked libraries provided with each vendor specific element in the storage area network). During the initialization process, the master functional component, through the use of a handle management interface and a connection data interface, can assign unique identities to the elements that correspond to each vendor specific access wrapper library that the access wrapper components detect and load. Thus, the master component instructs each access wrapper component to load any shared libraries for elements that that access component can manage. Once loaded, each elements assign a unique identifier (i.e., a handle) and the management client can thereafter request connection data required to establish a connection for management of that element. The master functional component can pass the connection data request to the appropriate access wrapper component which invokes the appropriate vendor specific access wrapper library function to retrieve and return connection data such as a username, password, network address or other information required for the management client to be able to connect with and manage the vendor specific element.

Upon receipt of connection data, the management client can establish a connection to the vendor specific element and can manage that element via generic management commands corresponding to functional interfaces provided by the functional components. Again, the functional component to which the generic management command is directed passes the call to any appropriate access wrapper component associated with management of the identified element. The access wrapper component translates the generic management function call into any required function calls for invocation of vendor-specific operations within the vendor specific access wrapper library which has be loaded and is responsible for managing the identified element. In this manner, the functional components and access wrapper components provide an insulated functional call interface (i.e., the functional component layer) and a translation layer interface (i.e., the access wrapper component) that can collectively convert the generic management commands into one or more vendor specific commands for management of elements within a storage area network.

Using the aforementioned software architecture of functional components, access wrapper components and corresponding vendor specific access wrapper libraries, according to one embodiment of the invention, one such technique for management of vendor specific elements comprises initializing a plurality of access wrappers. As noted above, each access wrapper defines operations for management of a respective class of elements operating within the storage area network. Once initialized, this embodiment of the invention can provide, to a management client, connection data associated with a specific element associated with one of the plurality of access wrappers. The connection data identifies connection data parameters (e.g., any required authentication information, plug-in information were network address information) for performing management of the specific element in the storage area network. The system then receives at least one generic management command for the specific element. The generic management command includes at least a portion of the associated connection data for the specific element. The generic management command corresponds to one or more of the functional interfaces provided by the functional components. The functional components forward the call to the appropriate access wrapper component(s) which operate to translate the generic management command(s) into an operation of at least one vendor-specific command within an access wrapper library. The vendor specific commands can include at least a portion of the associated connection data (e.g., for authentication of each command). This process allows the management client providing the generic management command to manage the vendor specific element in the storage area network without requiring intimate knowledge of the specific details of management of the vendor element.

The present invention also provides other embodiments which include a computer system configured to control management in a plurality of devices from different vendors in a storage area network. In such embodiments, the computer system comprises an input-output interface, a processor and a memory system coupled to the processor and to the input-output interface and the memory is encoded with instructions that form a multi-vendor management application. When the multi-vendor management application is performed on the processor (e.g., executes, interprets or is otherwise processed), it causes the computer system (i.e., a management station) to perform all of the operations disclosed herein as method embodiments (i.e., steps, operations) of the invention. That is, a computer system configured as a management station to perform all of the aforementioned methods via software control, or via hardware and/or software configured to perform those methods and the techniques disclosed herein is also considered an embodiment of the invention.

Other embodiments of the invention that are disclosed herein include software programs to perform the operations summarized above and disclosed in detail below. More particularly, a computer program product is disclosed which has a computer-readable medium including computer program logic encoded thereon to provide the methods for controlling management within an element according to this invention and its associated operations. The computer program logic, when executed on at least one processor within a computing system, causes the processor to perform the operations or the embodiments described herein. This arrangement of the invention is typically provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Is also to be understood that the management application of this invention typically performs (e.g., executes, runs, or is otherwise operated) on a management station coupled to a data storage are network or other type of network. The management station may be a dedicated computer system, personal computer or workstation operated by a network or systems administrator or manager. In alternative arrangements, the management application of this invention may reside on a computer system located elsewhere on the network and the user (e.g., network manager) that provides the generic management control commands may be located elsewhere on the network and may be communicating with the management application using a management client over a network connection (e.g., WWW or other browser-type interface, command-line interface, messaging interface, E-Mail, or another protocol or interface). Moreover, the multi-vendor command data may be stored local to, or remotely located from the management station and may be any type of database, file, table or other storage mechanism that can store such data.

An example implementation of the invention that incorporates certain of the aforementioned embodiments is the Widesky software management architecture and management applications that use the Widesky system that are manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS OF THE INVENTION

The present invention provides techniques and mechanisms that allow a network manager (person responsible for management and control of computing systems and/or other components) to operate a single storage area network management application to control, manage and configure different elements produced (i.e., manufactured) by different vendors that co-exist and operate together within the storage area network. In particular, the invention allows the network management application (e.g., software program) to control management of various storage area network elements (e.g., devices, programs, processes) such as hardware and software processes with switches, host bus adapters, hosts, servers, and data storage and backup systems that each require a different command set or a different application programming interface (API) for management or control.

Figure 1:
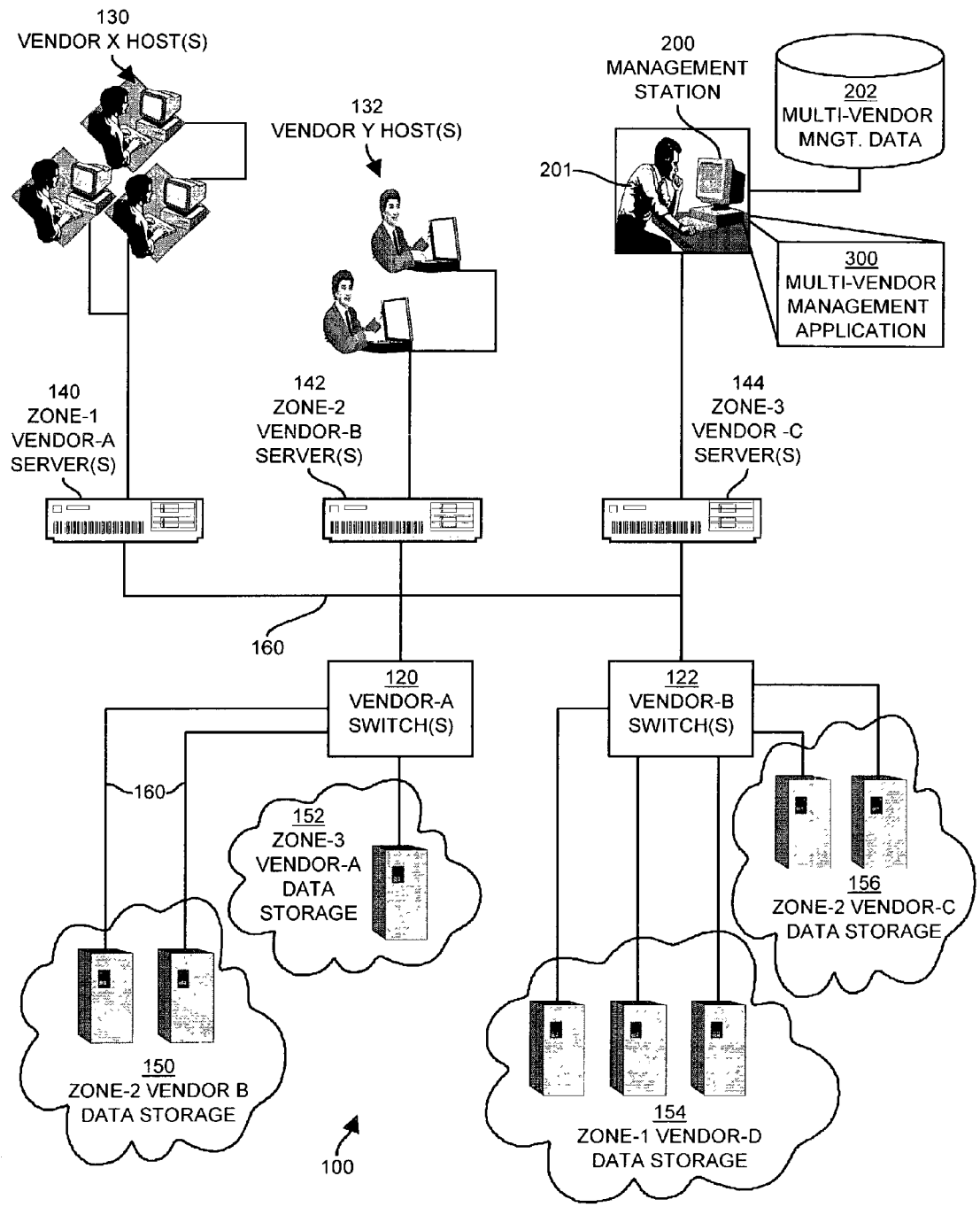
FIG. 1 illustrates an example of a storage area network that is suitable for use in describing example operations of a management application configured in accordance with embodiments of the invention.

FIG. 1 illustrates an example of a storage area network 100 suitable for use in explaining the operation of example embodiments of the invention. Generally, the storage area network 100 includes a network 160 that interconnects a plurality of vendor-specific elements. The vendor specific elements in this example include physical devices such as the servers 140, 142 and 144, one or more storage area network switches 120, 122, a plurality of data storage systems 150 through 156, and arrangements of network hosts 131, 132 and 200 that couple to one or more of the servers 140 through 144. While not specifically enumerated in FIG. 1, other elements may include cards, adapters and software programs and processes that operate within the illustrated devices. An element is generally defined as any hardware and/or software entity that may be remotely managed, controlled, monitored or otherwise operated by the multi-vendor management application 300.

The host 200 operates as a network management station and performs (e.g., executes, interprets or otherwise operates) a multi-vendor management application 300 that accesses multi-vendor management data 202 (e.g., a database). A network manager (i.e., a person) 201 operates the multi-vendor management application 300 within the network management station 200 to control and configure management within some or all of the elements 120, 122, 131, 132, 140, 142, 144, 150, 152, 154 and/or 156. In this example, the network manager 201 has operated the multi-vendor management application 300 to configure the storage area network 100 into three zones (zone-1, zone-2, zone-3). The zones are essentially groupings of ports within the switches 120, 122 that identify other elements in the storage area network 100 as being part of the same zone or group for access control and data routing purposes. In this example, zone-1 includes the zone-1 hosts 130, the zone-1 server 140, and the zone-1 data storage systems 154, while zone-2 includes the zone-2 hosts 132, the zone-2 server 142, and the zone-2 data storage systems 150 and 156, while zone-3 includes the zone-3 host 350 (i.e., the network management station 200 in this example), the zone-3 server 144, and the zone-3 data storage systems 152.

Of particular importance to this discussion of example embodiments of the invention is that different vendors or manufacturers produce the various elements installed within this example storage area network 100, and that the single management application 300 manages this heterogeneous storage area network 100. In other words, the storage area network 100 is a composition or interconnection of various heterogeneous components that may each require control or operation (i.e., management) somewhat differently from each other, and these management tasks are centralized by the management application 300. By way of example, vendors A and B manufacture storage area network switches 120, 122, respectively. Each vendor-specific switch 120, 122 may require the use of vendor-specific command set(s) or a vendor-specific application programming interface to control switch management (e.g., zoning, data path establishment, performance monitoring and/or other switch control) with that switch. The management application 300 configured according to embodiments of invention is capable of providing management of each vendor-specific switch 120 and 122 without requiring the network manager 201 to having to learn separate individual management commands for each different vendors switch 120 and 122.

In contrast to this invention, in a conventional storage area network (not shown in here), each vendor provides a respective vendor specific network management application that includes an appropriate command set to control management of that vendor's elements within the storage area network 100. If a conventional storage area network were to use elements from multiple vendors, the network manager would be required to learn and operate multiple vendor-specific management applications (one for each different vendor) to manage each element since each different vendor element requires the use of vendor specific management and control commands (i.e., a vendor specific API). Using the switch example from above in an example of a conventional configuration (i.e., without the use of the multi-vendor management application 300 of this invention), the network manager 201 would be required to install switch management software onto the management station 200 for both vendor-A and vendor-B. Conversely, the multi-vendor management application 300 configured according to embodiments of this invention allows the network manager 201 to control and configure all elements in the storage area network 100 including the switches 120 and 122, irrespective of which vendor produces or provides such elements.

Embodiments of the invention thus allow a network designer (e.g., network manager 201) to design a storage area network using elements such as data storage systems, servers, hosts, adapters, switches and remotely manageable software processes obtained from different vendors without regard to maintaining separate management applications. In particular, the network manager 201 may initially create a storage area network using, for example, a data storage switch or other element from vendor-A (e.g., switch 120), and then, at a later time may decide to purchase a data storage element from another vendor (e.g., vendor-B data storage switch(s) 122) and incorporate these diverse vendor elements into the same storage area network. The inventions thus significantly avoid problems a network manager may encounter including having to install, maintain, pay for and learn how to operate separate network management applications to administer elements from different vendors.

Figure 2:
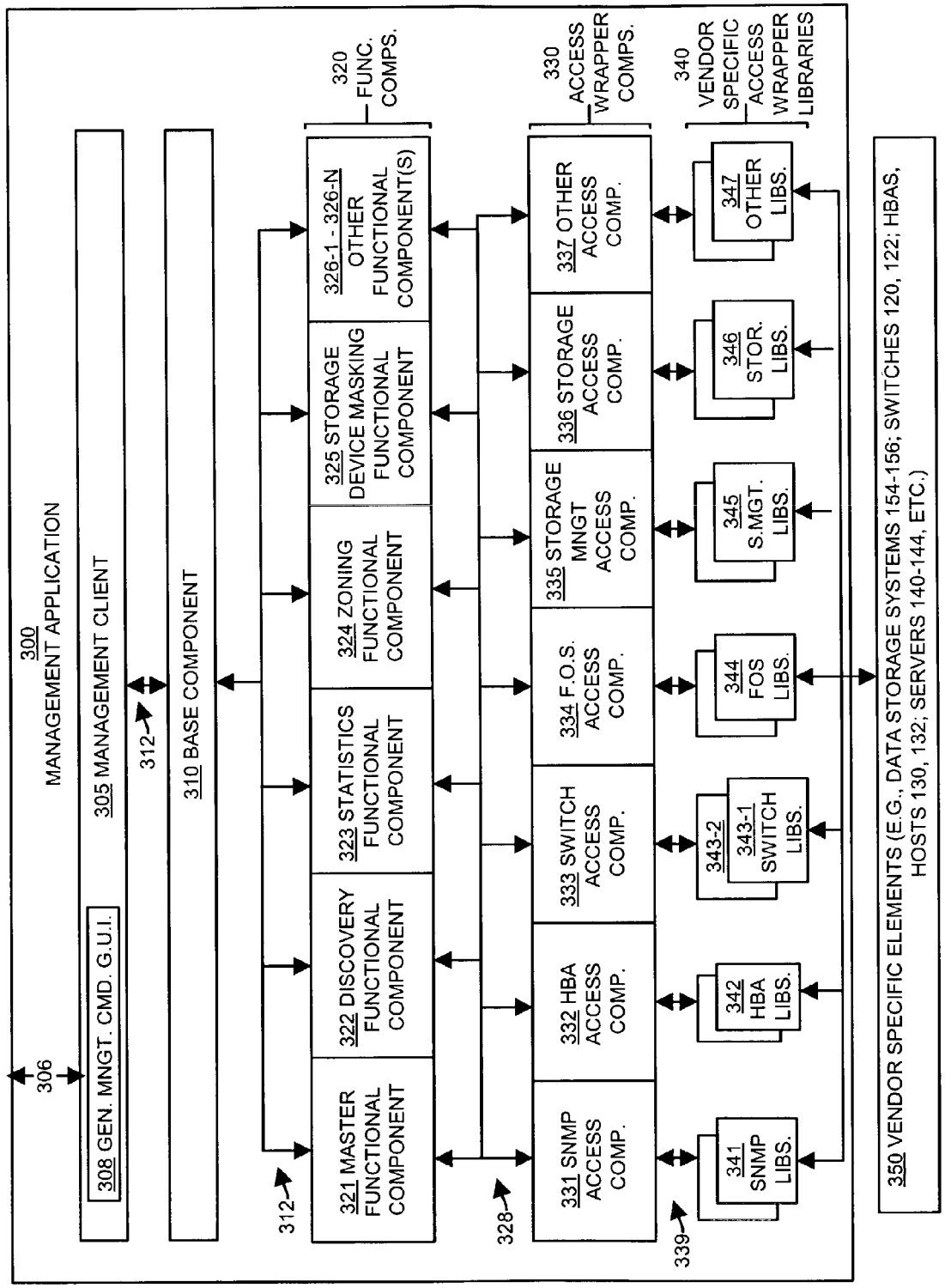
FIG. 2 is a flow chart of high-level processing steps showing operations performed by embodiments of this invention.

FIG. 2 illustrates one example configuration of a software architecture of the management application 300 in accordance with one embodiment of the invention. In this example configuration, the management application 300 includes one or more management clients 305 (only one shown in this example), a base component 310, a plurality of functional components 320, a plurality of access wrapper components 330, and a plurality of access wrapper libraries 340 that are capable of controlling respective vendor specific elements 350 that operate within a storage area network (e.g., 100 in FIG. 1). The management application 300 is typically implemented as a software program or application in a suitable programming language such as C, C++ or Java (Java is a trademark of Sun Microsystems, Inc.).

The management client 305 generally provides a management interface 306 such as a graphical user interface (e.g., web based or windows interface) that a network manager 201 (i.e., person responsible for managing a storage area network) can use to input or select generic management commands 308. The generic management commands 308 convey storage area network management and control operations to be carried out within particular vendor specific elements 350 (e.g., elements 120, 122, 131, 132, 140, 142, 144, 150, 152, 154 and/or 156 as illustrated in the example in FIG. 1) operating within the storage area network 100.

The base component 310 links together, either statically or dynamically, the various functional components 320 and provides concurrency protection for the functional components 320. The functional components 320 (i.e., 321 through 326) implement and provide a number of management interfaces 312 that collectively operate as an enterprise storage are network application programming interface (ES-NAPI) and provide the respective generic management commands 308. The base component 310 exports 309 these functional interfaces 312 to the management client 305 which may, under control of the network manager 201 via the interface 306, chose to operate one or more of the generic management commands 308 via calls 312 from the management client 305 to the generic management command interfaces 312 that the functional components 320 provide. The functional components 320 thus represent "buckets of functionality" and provide an enterprise storage network application programming interface that implements the collection of generic management commands 308 via the functional management interfaces 312. Each functional component 320 implements a collection of related generic management commands for a type of class of elements 350.

In this example, the functional components 320 include a master functional component 321, a discovery functional component 322, a statistics functional component 323, a zoning functional component 324, a storage device masking functional component 328 and other functional components 326-1 through 326-N (as needed). The functional components 320 thus provide a functional application programming interface for the management client 305 by providing management interfaces 312 for respective generic management commands 308.

The master functional component 321, as will be explained in more detail, implements functional interfaces for initialization and management of the other functional components 320 and the access wrapper components 330. The discovery functional component 322 and its interface allow a management client 305 to perform discovery operations of elements 350 within the storage area network 100. This allows the management client 305 to determine what managed object elements 350 exist within the storage area network 100 and how they are interconnected. The statistics functional component 323 provides interfaces for performance monitoring and statistics collection regarding operation of the vendor specific elements 350. The zoning functional component 324 manages zoning operations of the elements 350. The storage device masking functional component 325 provides access control for storage devices within the storage area network 100. In an enterprise wide storage area network, multiple server computer systems may share a common storage port on a switch and may thereby have access to all devices exported on the port. Accordingly, storage device masking provides storage access control on a logic volume basis that can be enforced at the server, or within the data storage system, or within an intermediate component such as a vendor switch.

Generally, in operation, the functional components 320 receive the generic management command calls (via user selection at location 308) via the generic management interfaces 312 and map or route the management interface calls 312, based on the identity of the element to be managed (i.e., as specified by the management client 305 when making the call to the functional interface 312), to one or more access wrapper interfaces 328 that the access wrapper components 330 provide.

The access wrapper components 330 include, in this example, a simple network management protocol (SNMP) access wrapper component 331, a host bus adapter (HBA) access wrapper component 332, a switch access wrapper component 333, a fiber optic switch (F.O.S.) access wrapper component 334, a storage management access wrapper component 335, a storage access wrapper component 336 and other access wrapper components 337, as may be required to manage vendor specific elements 350. Generally, the access wrapper components 330 understand and interpret vendor specific application programming interfaces 339 provided by respective vendor specific access wrapper libraries 340. Accordingly, a set of one or more vendor specific access wrapper libraries 340 (341 through 347 in this example) corresponds to each access wrapper component 330. As an example, a set of switch libraries 343 is associated with the switch wrapper access component 333 and is used for managing storage area network data switches, whereas operation of a fiber optic storage area network switch is handled by the fiber optic switch access wrapper component 334 and is performed using the fiber optic switch libraries 344.

Manufacturers provide the access wrapper libraries 340 at the time of purchase or installation of the various vendor specific elements 350 that operate within the storage area network 100. According to embodiments of the invention, the access wrappers 330 contain translation functions that map one or more of the generic management interfaces 312 (i.e., generic management commands) which the receive at the access wrapper interfaces 328 into an appropriate set of one or more vendor-specific commands 339 implemented within one or more respective vendor specific libraries 340 to control and mange 349 one or more vendor-specific elements 350.

As an example of the operation of the architecture illustrated in FIG. 2, embodiments of the invention provide a zoning functional component 324 that provides interfaces 312 for a suite of generic zoning management commands that management clients 305 may access (i.e., may call). If a storage area network is configured with two storage area network data switches (e.g., SAN switches 120, 122) manufactured by two different switch vendors, embodiments of the invention provide a switch access wrapper component 333 that is capable of accessing (i.e., loading) the respective vendor-specific switch management libraries 343-1 and 343-2 (e.g., dynamically linked libraries provided by the respective vendors A and B of the data switches) in order to provide management capability of the two different switches from the vendors A and B in response to receiving a single generic zoning management command 312. In other words, the zoning functional component 324 in this example provides a set of generic application programming interfaces 312 that support general zoning management operations no matter which particular vendor switch is being controlled and no matter what type of switch (e.g., fiber optic, Ethernet, Fibre channel, etc.). The zoning functional component 324 causes the switch access wrapper 333 to load the appropriate switch libraries 343 corresponding to switch vendors A and B and then to translate the generic zoning management command 308 received via interface 312 (at the zoning functional component 324) and 328 (at the switch access wrapper library 333) into the appropriate vendor-specific zoning command(s) 339 depending upon which vendor-specific switch 120, 122 the zoning commands are directed towards. Note that if the identity of multiple switch elements are contained in a generic management command functional interface calls 312 (e.g., create a new zone into different switches), and one switch contained an identity of the element corresponding to a fiber optic switch while another element identity corresponds to, for example, an Ethernet switch, the zoning functional component 324 invokes operation of both the fiber optic access wrapper component 334 (for translation of the generic management interface calls 312 into one or more interface calls 339 to the appropriate fiber optic switch library 344 to control the vendor specific fiber optic switch), and would also invoke operation of the switch access wrapper component 333 for invocation of appropriate vendor specific commands to carry out the same zone creation operation within the appropriate Ethernet switch.

As will be explained more detail, upon beginning operation, the master functional component 321 coordinates initialization and identity assignment and management of the functional components 320 as well as the access wrapper components 330. Through operation of a master component 321, the management client 305 is able to trigger the access wrapper components 330 to initialize (i.e., load) the appropriate access wrapper libraries 340. During this process, the access wrapper components 330 are able to query the master component 321 for the identity of elements 350 operating within the storage area network 100 as they are initialized.

The master component 321 also provides a unique "connection data" interface that allows management clients 305 to obtain any necessary connection data group information such as usernames, passwords, network addresses or other element access or authentication information required to control the vendor-specific elements 350 operating within the storage area network 100. The management client 305 can thus obtain a connection data group for a specific vendor element, and can thereafter invoke the generic management interface 312 by specifying an identity of an element 350 and any required connection data necessary for access to that element 350.

In addition, the master component 321 implements a unique handle management interface that manages assignment of unique identifiers or handles to interfaces and elements 350 under management control of the management application 300. In this manner, a management client 305 can query the master functional component 321 for the unique identity of elements 350 operating in the storage area network 100 and does not need to be concerned with overlapping names of elements 350. Embodiments of the invention thus ensure a unique namespace within the storage area network 100 regardless of which vendor devices operate therein and without placing unique naming responsibility within the management clients 305. Accordingly, multiple management clients 305 operating on the same or different management stations 200 can access the management application 300 providing the functional application programming interfaces 312 as explained herein without conflicting namespace issues arising.

Once a management client 305 is aware of which elements 350 are available for management, the management client 305 can further query the master component 321 provided by embodiments of the invention in order to identify the specific management interfaces 312 available for control and management of the identified elements. Thereafter, specific calls 312 to the management interfaces are received by the respective functional components 320 and are mapped to the proper access wrapper components 330 that then translate the generic management command calls 328 into the vendor-specific commands 339 for invocation within the vendor specific elements 350. Note that a single generic management command calls 312 may be directed, by a functional component 320, to calls 328 to multiple access wrapper components 330 (i.e., may be converted into multiple access wrapper interface calls 328) depending upon the identity can elements specified to be managed by the generic management command. In this manner, a management client 305 is insulated from the details of operation of managing specific vendor elements 350. That is, the management client 305 does not need to be concerned with what particular vendor manufactures an element, nor does the code within the management client 305 need to be configured with (i.e., programmed for) any vendor-specific commands to control management operations within the elements 350.

Figure 3:
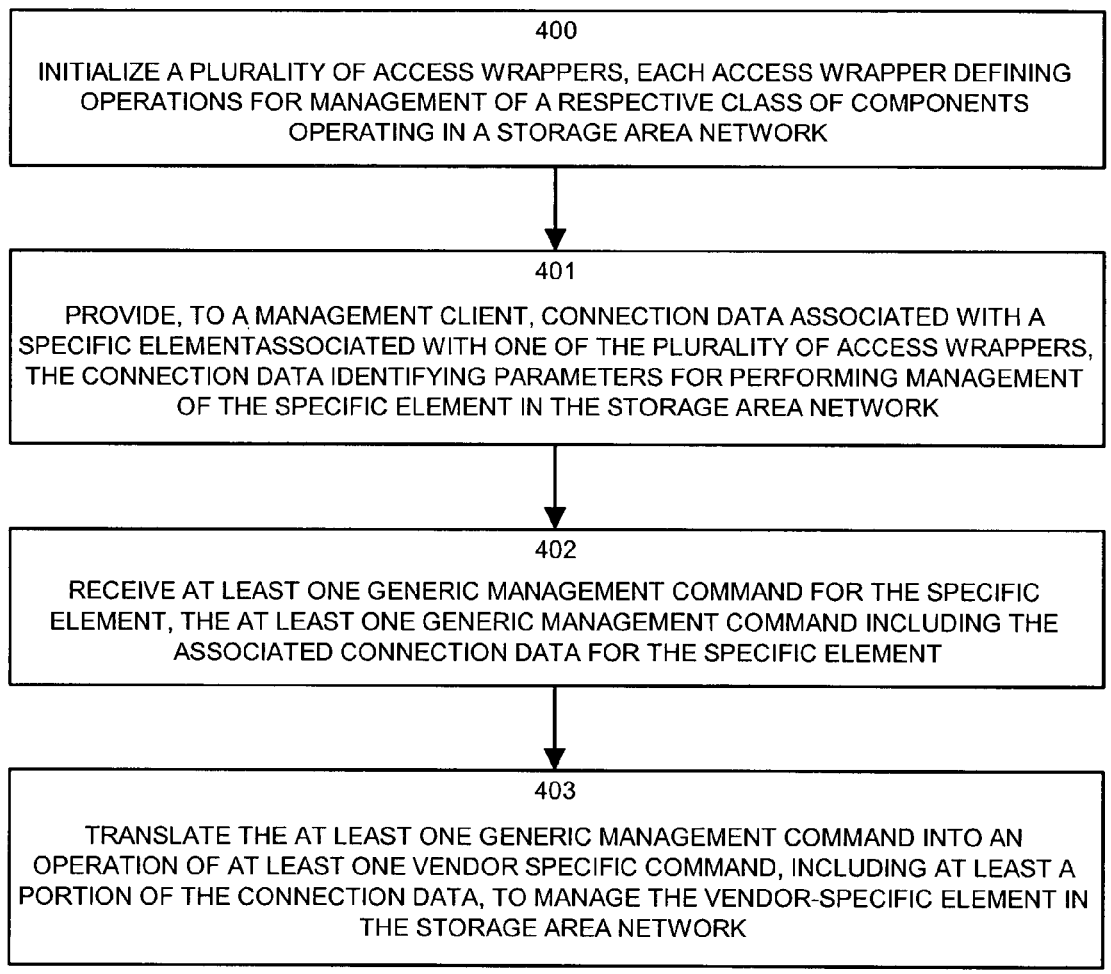
FIG. 3 illustrates an architecture of a management application including a universal application programming interface configured in accordance with one example embodiment of the invention.

FIG. 3 is a flow chart of processing steps that illustrate the high-level operation of a management application 300 configured according to one embodiment of the invention. Specific details of certain of the individual steps in FIG. 3 will be explained further with respect to the detailed description of other figures and flow charts that follow this high-level description of operation.

In step 404, the management application 300 initializes a plurality of access wrappers 330. Each access wrapper 330 defines operations for management of a respective class of elements operating within a storage area network 100. Initialization of the access wrappers 330 may include dynamically loading the access wrappers as needed or may include, reading configuration file associated with the management application 300 to determine which access wrappers 330 are to be initialized.

Next, in step 401, the management application 300 provides, to the management client 305, connection data associated with a specific element 350 that is associated with one of the plurality of access wrappers 330. As briefly noted above and as will be explained in more detail, connection data (i.e., a connection data group for a specific element 350) identifies connection parameters such as usernames, passwords or other access control information that may be required for performing management of the vendor-specific element 350 in the storage area network.

In step 402, the management application 300 receives at least one generic management command for the vendor specific element 350. The generic management command (one or more) includes the associated connection data (or at least a portion thereof) for the specific element 350.

In step 403, the management application 300 translates the generic management command(s) (e.g., translates a functional interface call 312 in FIG. 2) into an operation of at least one vendor specific command (e.g., 339) that includes at least a portion of the connection data in order to manage 349 the vendor-specific element 350 in the storage area network 100.

In this manner, embodiments of the invention operate to initialize the access wrapper components 330 and the associated vendor specific libraries 340. Once initialized, mechanisms operate to provide necessary connection data to the management client 305. The management client 305 can then provide generic management commands that are translated into vendor-specific commands for operations within the vendor specific elements 350.

Figure 4:
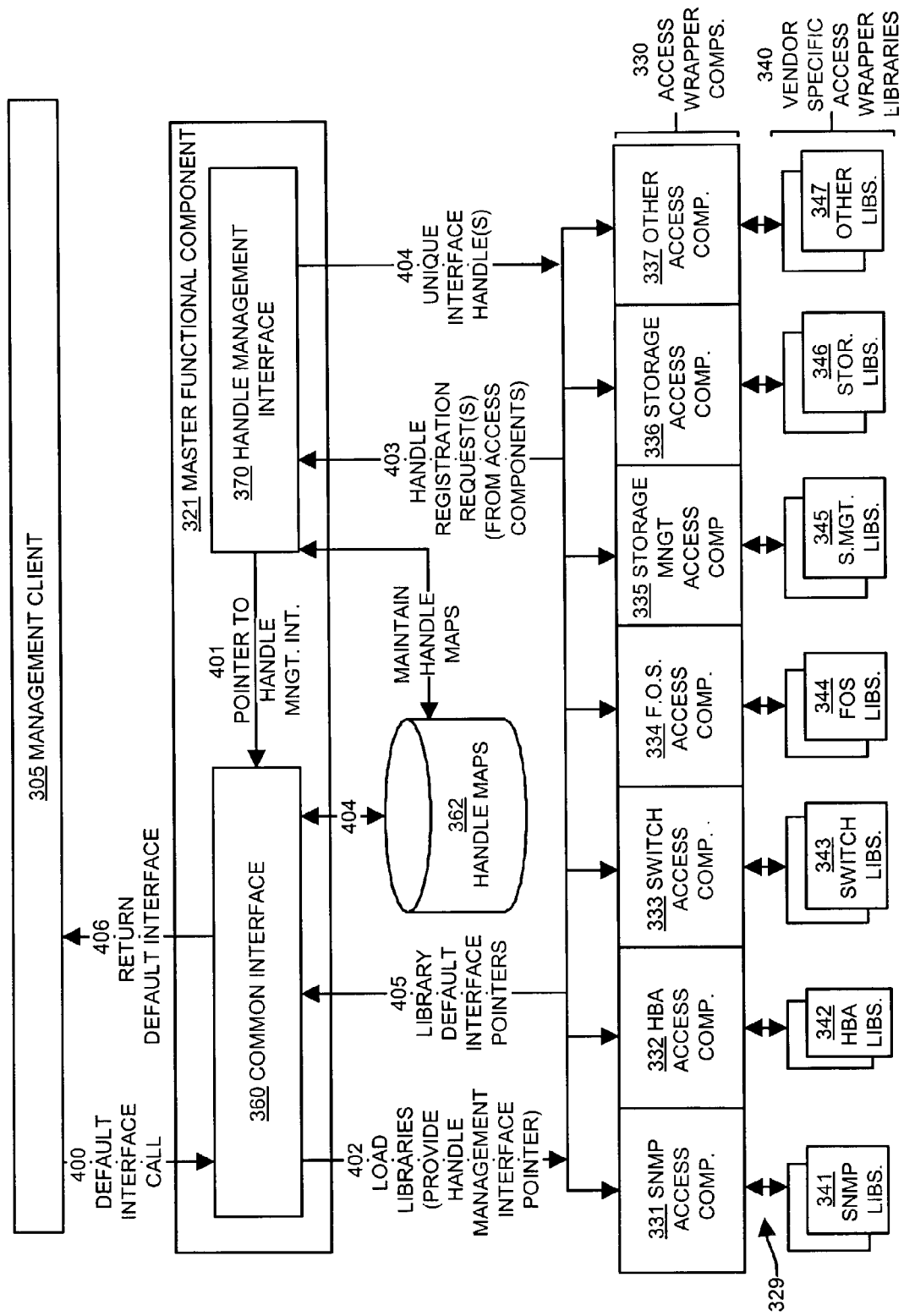
FIG. 4 illustrates operation and data flow of a management application initialization sequence in accordance with one example embodiment of the invention.

FIG. 4 illustrates data flow and operations performed during initialization processing of a management application configured according to embodiments of the invention. In addition, FIG. 4 illustrates details of operation of the master functional component 321. The master functional component 321 in this example configuration includes a common interface 360 and a handle management interface 370. The master functional component 321 also maintains handle map data 362. Generally, the common interface 360 is used to initialize and un-initialize the access wrapper components 330 within the management application 300. During initialization, the master component 321 dynamically loads the access wrappers 330 and initializes them. This includes creating a unique identity of the access wrappers. The unique identity is referred to as a library, element or interface handle. The master component also obtains defaults interface pointers for each access wrapper 330 and stores this association (unique identify handle to default interface) in the handle map data 362. The handle map data 362 allows an interface handle to be mapped (i.e., looked up) to a particular default interface of the access wrapper 330. The operation of initialization processing performed as illustrated in FIG. 4 will be explained with respect to the processing steps shown in the flow chart in FIG. 5.

Figure 5:
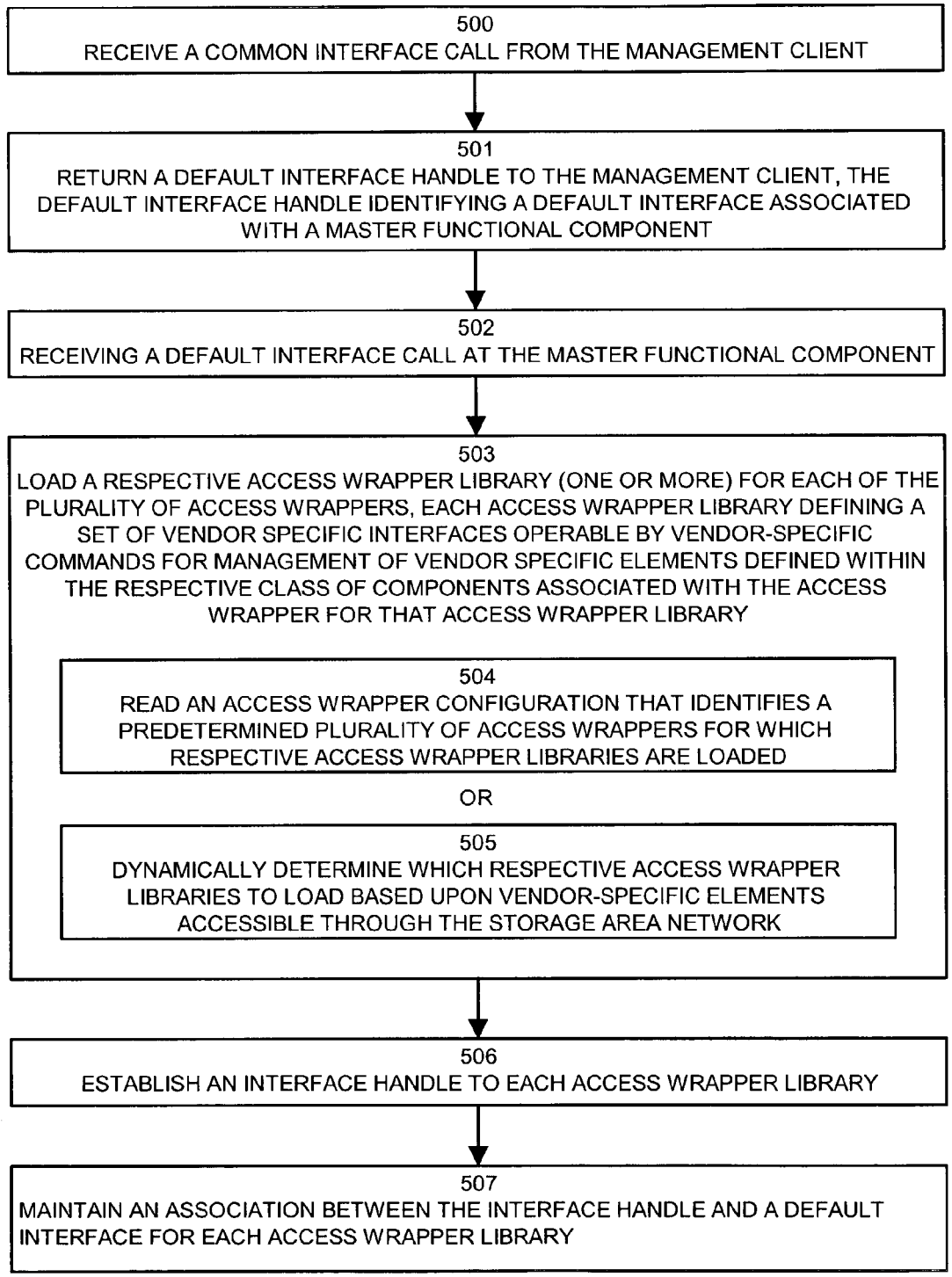
FIG. 5 is a flow chart of processing steps for initialization processing of a management application configured in accordance with one example embodiment of the invention.

FIG. 5 is a flow chart of processing steps that shows processing steps performed during initialization processing of the management application 300 configured according to one example embodiment of the invention.

In step 500, the master functional component 321 receives a common interface call from a management client 305. This causes activation of the initialization process.

In step 501, in response to receiving a common interface call, the master functional component 321 returns the default interface handle to the management client 305. The default interface handle identifies a default interface associated with the master functional component 321.

Next, in step 502 and as illustrated at location 400 in FIG. 4, the master functional component 321 receives a default interface call (400). The default interface call indicates to the master functional component 321 and initialization is to be performed.

In step 503 and as illustrated at location 402 in FIG. 4, the master functional component 321 causes the access wrapper components 330 to load a respective access wrapper library 340 (one or more) for each of the plurality of access wrappers 330. Each access wrapper library 340 defines a set of vendor-specific interfaces 339 operable by vendor-specific commands for management of vendor-specific elements 350 defined within the respective class of components associated with the access wrapper 330 for that access wrapper library 340. In other words, in step 503, the master functional component 321 configures the access wrappers 330 to load their corresponding vendor specific libraries 340 for use in management of vendor specific elements 350.

Steps 504 and 505 illustrate two ways in which the master functional component 321 can determine which respective access rather libraries 340 to load.

In step 504, in one configuration, the master functional component 321 can read an access wrapper configuration (e.g., a file) that identifies a predetermined plurality of access wrappers 330 for which respective access wrapper libraries 340 are loaded.

In an alternative configuration as illustrated in step 505, the master functional component 321 can dynamically determine which respective access wrapper libraries 340 to load based upon vendor-specific elements 350 that are dynamically accessible through the storage area network 100 as requirements to manage such elements arise. In this manner, the master functional component 321 can either statically or dynamically determined which access wrappers 330 will be used during management of elements 350 in the storage area network 100 in order to load the appropriate vendor specific access wrapper libraries 340 for use during management operations.

Next, in step 506 the management application 300 establishes an interface handle to each access wrapper library 340. Details of operation of establishing a handle for each access wrapper library 340 will be explained next respect to the flow chart of processing steps illustrated in FIG. 6. Generally however, the handle management interface 370 is internal to the management application 300 and serves to primary functions. The first is to normalize identities of interfaces discovered and utilized within the management application 300. Such identities are in the form of handle numbers returned from access wrappers 330 as will be explained. A second function associated with the handle management interface 370 is to maintain a list of which access wrappers 330 generated which interface handles so that other functional components 320 can request default interface pointers to particular access wrappers 330 by using the appropriate handle. In other words, the handle management interface 370 allows access wrappers 330 to provide a handle identity in the form of the handle registration request 403 which the handle management interface 370 normalizes to ensure its uniqueness. The handle management interface 370 then provides (i.e., passes) each interface handle 404 back to the requesting access wrapper 330 and records the unique interface handle in conjunction with the default interface pointer of the access wrapper within a handle map 362 for future use by other components within the management application 300. The flow chart of processing steps in FIG. 6 illustrates details of handle management.

Figure 6:
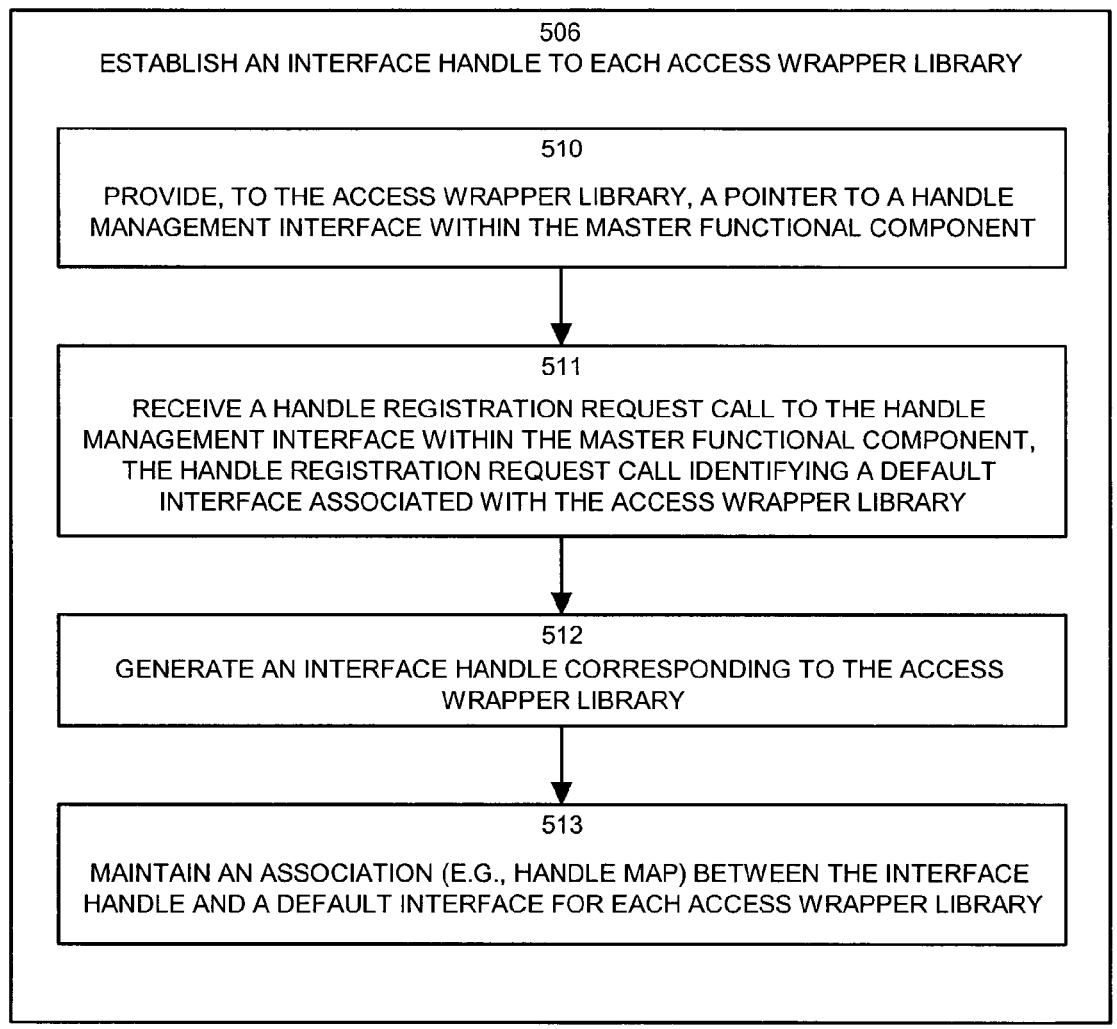
FIG. 6 is a flow chart of processing steps explaining details of establishing interface handles within a management application configured in accordance with one example embodiment of the invention.

FIG. 6 is a flow chart of processing steps showing the details performed by the management application 300 in order to establish an interface handle to each access wrapper library 340 according to one example embodiment of the invention.

In step 510, the handle management interface 370 provides, to the common interface 360, a pointer 401 (FIG. 4) to the handle management interface within the master functional component 321. As the common interface 360 initializes each respective access wrapper component 330 causing each of the access wrappers 330 to load the access wrapper libraries 340, the common interface 360 provides the handle management interface pointer 401 to each access wrapper library 340 in the load library request 402. This allows the access wrappers 330 to provide a handle registration request 403 to the handle management interface 370 for receipt of a unique handle.

In step 511, the handle management interface 370 receives a handle registration request call 403 from an access wrapper library 330. The handle registration request call identifies a default interface associated with an access wrapper library 340 that the access wrapper 330 has just loaded.

In step 512, the handle management interface 370 generates the unique interface handle corresponding to the access wrapper library 340 identified in the handle registration request 403 (FIG. 4).

Next, in step 513, the handle management interface 370 maintains an association (e.g., within the handle map 362) between interface handles generated and the default interface for each access wrapper library 340 loaded. In this manner, the handle management interface 370 operating within the master functional component 321 causes each access wrapper library 340 to have a unique handle or identity associated with its default interface. This default interface to handle identity information is stored within the handle map 362 for use when other components within the management application 300 require access to operations within the access wrapper libraries 340.

Returning attention now back to the flow chart of processing steps illustrated in FIG. 5, after the processing of step 506 is complete, the handle map 362 contains a listing of the default interface pointers for each access wrapper library 340 that each access wrapper 330 has initialized (i.e., has loaded into memory within the management station 200).

Next, in step 507, the master functional component 321 maintains the association within the handle map 362 between interface handle and a default interface pointer for each access wrapper library 340 for access by other functional components 320. In other words, in step 507, the master functional component 321 makes the handle map 362 available for use during subsequent operation of the management application.

Accordingly, from the aforementioned processing explained with respect to the steps in FIG. 5, the master functional component 321 performs initialization of the access wrapper libraries and determines which access wrapper components 330 exist and, for each, causes the access wrapper components 330 to load any vendor libraries 340 that may be required for management of vendor specific elements 350. At this point in processing, the management client 305 has activated the default interface of the master functional component 321 but it is not yet aware of what storage area network elements 350 can be managed. In order to determine what elements 350 can be managed, the management client 305 performs the processing operations illustrated in FIG. 7 and explained in detail with respect to the processing steps shown in the flow chart in FIG. 8.

Figure 7:
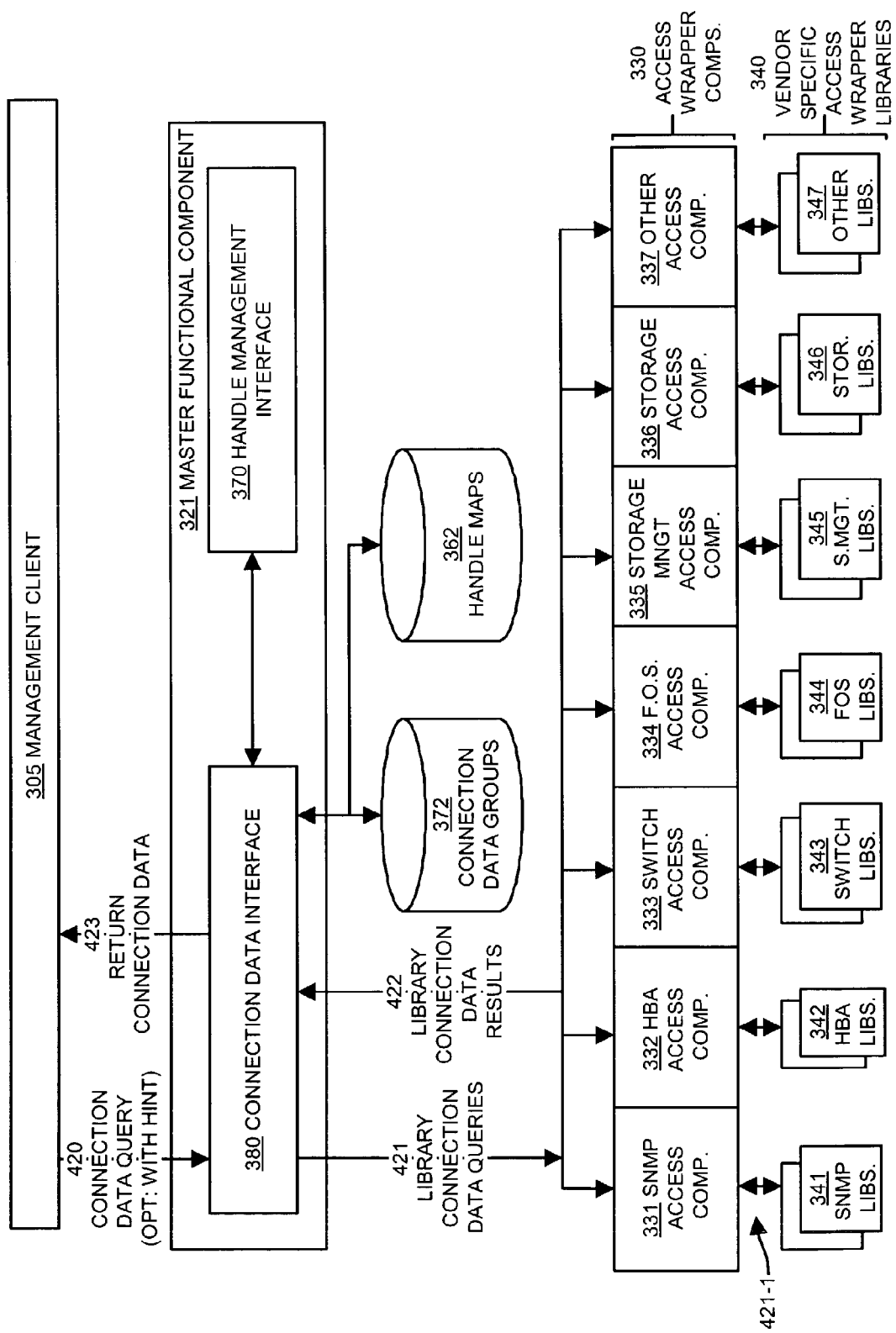
FIG. 7 illustrates operation and data flow of connection data processing within a management application configured in accordance with one example embodiment of the invention.

FIG. 7 illustrates operation of the connection data interface 380 within the master functional component 321. The connection data interface 380 handles connection data requests from the management client 305 and allows the management client 305 to determine what elements can be managed. More specifically, the connection data interface 380 provides the ability for management client 305 to dynamically obtain any connection data that may be required to communicate with specific elements 350 operating within the storage area network 100. Since the storage area network 100 can include different element types (e.g., switches, data storage systems, hosts, adapters, software processes and the like) made by the same or by different vendors, there may be variable mechanisms required for making a connection between the management application 300 and a particular vendor specific element 350 in order to manage that element 350.

Making a connection to one vendor element 350 may be as simple as correctly addressing the element for communication within the storage area network 100. In contrast, another vendor-specific element 350 may require some user defined data such as a login name and/or password in order to connect to and manage that element. The connection data interface 380 operating within the master functional component 321 provides the interface to pass connection data group information from the vendor specific libraries 340, through the access wrapper components 330, for presentation to the management client 305. A connection data group 372 describes a collection of information that the management application 300 requires to properly connect to a specific type of vendor element 350 them. A connection data group 372 can include both a description of its purpose, as well as a collection of entries containing pieces of information such as usernames, IP addresses, passwords and the like required to connect to an element 350. Accordingly, each vendor element 350 includes a respective connection data group 372.

As an example, a connection data group 372 for a data switch 120 operating within the storage area network 100 may appear as follows:

Description: "Connection data for Vendor A storage area network switch"
Username: "Administrator"
Password: "Admin"

EXAMPLE OF CONNECTION DATA

After initialization of the access wrappers 330 and associated vendor specific access wrapper libraries 340 is complete (as explained above with respect to FIGS. 4 through 6), the management client 305 is now aware of the particular storage area network elements 350 that can be managed. Accordingly, using the connection data interface 380 illustrated in FIG. 7 in conjunction with the processing steps illustrated in FIG. 8, the management client can find out what elements 350 can be managed by getting the corresponding connection data groups 372 that are available (i.e., that are associated with the elements 350). To obtain the connection data groups 372, generally, the management client 305 requests this information from the connection data interface 380 which calls or queries each access component 330 and collects the connection data results in the connection data groups database 372 and returns this information as connection data 423 to the management client 305. That is, the connection data interface 380 retrieves connection data groups from the access wrapper components 330 in a secure manner upon loading the respective vendor specific access wrapper library 340 for management of an element 350 to which this connection data group corresponds. This connection data group is also returned at location 423 to the management client 305 as illustrated in FIG. 7. Specifics of the connection data processing will now be explained with respect to the flow chart of processing steps illustrated in FIG. 8.

Figure 8:
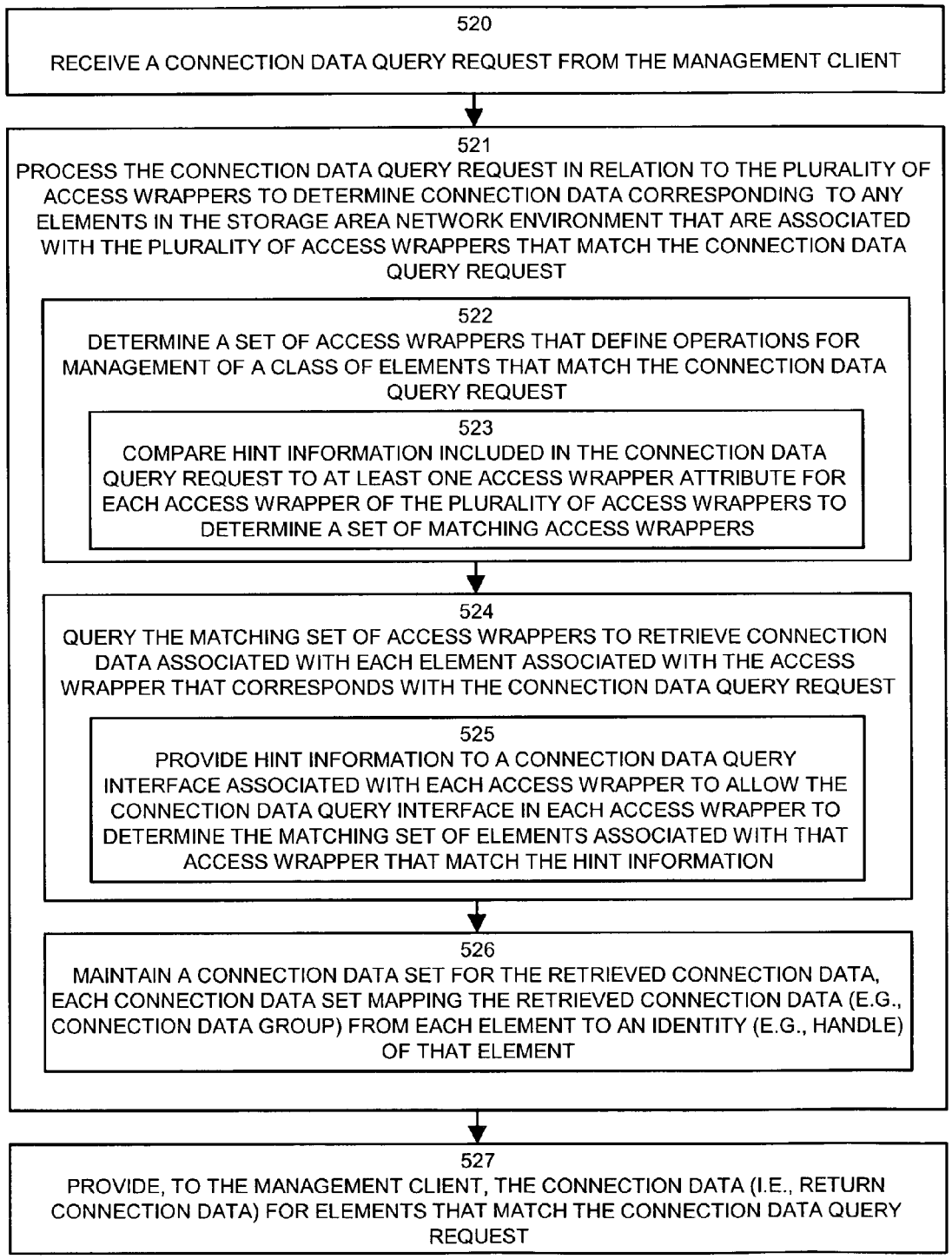
FIG. 8 is a flow chart of processing steps that show connection data processing by a management application configured in accordance with one example embodiment of the invention.

FIG. 8 provides a flow chart of processing steps performed by a management application 300 configured with a connection data interface 380 in accordance with one example embodiment of the invention.

In step 520, the connection data interface 380 operating within the master functional component 321 receives a connection data query request 420 (FIG. 7) from the management client 305. The connection data query request 420 can be a simple request generically asking for connection data or, in an alternative embodiment of the invention, can include hint information that specifies, for example, a specific vendor (i.e., a specific device manufacturer) for which connection data is to be retrieved or can specify a specific type of element 350 for which connection data is to be retrieved.

Next, in step 521, the connection data interface 380 processes the connection data query request 420 in relation to the plurality of access wrappers 330 to determine connection data corresponding to any elements 350 in the storage area network 100 that are associated with the access wrappers 330 and that match the connection data query request 420. In one example embodiment, steps 522 through 526 (explained below) carry out the general processing of step 521.

In step 522, the connection data interface 320 determines a set of access wrappers 330 that define operations for management of a class of elements that match the connection data query request 420. Step 523 shows an example of details of processing performed in step 522 according to one embodiment of the invention.

In step 523, the connection data interface 380 compares hint information included within the connection data query request 420 to at least one access wrapper attribute for each access wrapper 330 of the plurality of access wrappers (i.e., for each access wrapper loaded during the initialization processing) to determine a set of matching access wrappers 330 that match the connection data query 420. In other words, in steps 522 and 523, the connection data interface 380 can receive hint information within the connection data query 420 and can compare this to access wrapper component attributes to determine which access wrappers 330 control shared vendor specific access wrapper libraries 340 for particular elements 350 that match the connection data query 420.

Next, in step 524, the connection data interface 380 queries the matching set of access wrappers 330 (determined in step 522) to retrieve connection data results 422 (FIG. 7) associated with each element 350 corresponding to (i.e., under control of) that access wrapper 330 that corresponds with the connection data query request 420. As illustrated in detail in processing step 525, the connection data interface 380 can provide a library connection data query 421 that provides hint information to be passed to a connection data interface provided within each access wrapper 330 to determine the matching set of elements 350 associated with that access wrapper 330 that matches the hint information. In this manner, if an access wrapper 330 such as a switch access wrapper component 333 receives hint information that indicates connection data is to be retrieved for a certain switch manufacturer only, or a certain switch type, the switch access component 333 can query the appropriate switch libraries 343 for those particular vendors (i.e., based on hint information) in order to retrieve and return the appropriate library connection data results 422 back to the connection data interface 380 as illustrated in FIG. 7 for all matching switch libraries 343.

Next, in step 526, the connection data interface 380 maintains a connection data set (i.e., a set of connection data groups 372) for all retrieved connection data. Each connection data group maps the retrieved connection data (e.g., a connection data group for a specific element 350) from each element to an identity (e.g., the unique handle assigned during initialization) for that element. In other words, in step 526, the connection data interface 380 maintains a mapping between the connection data group for each element 350 and a handle or other unique identity for that element 350. After the processing of steps 521 through 526 is complete, connection data processing proceeds to step 527.

In step 527, the connection data interface 380 provides or returns, to the management client 305, the connection data group 423 for elements 350 that match the connection data query request 420.

At this point in processing, the management client 305 is now aware of what elements 350 can be managed with the management application 300, but does not yet have a specific connection to any particular element 350. Accordingly, the next phase of processing will be explained with respect to FIGS. 9 and 10 to illustrate how an example embodiment of the invention can allow the management client 305 to connect to one or more vendor specific elements and to obtain (i.e., discover) the functional interfaces 312 that are available for management of that element.

Figure 9:
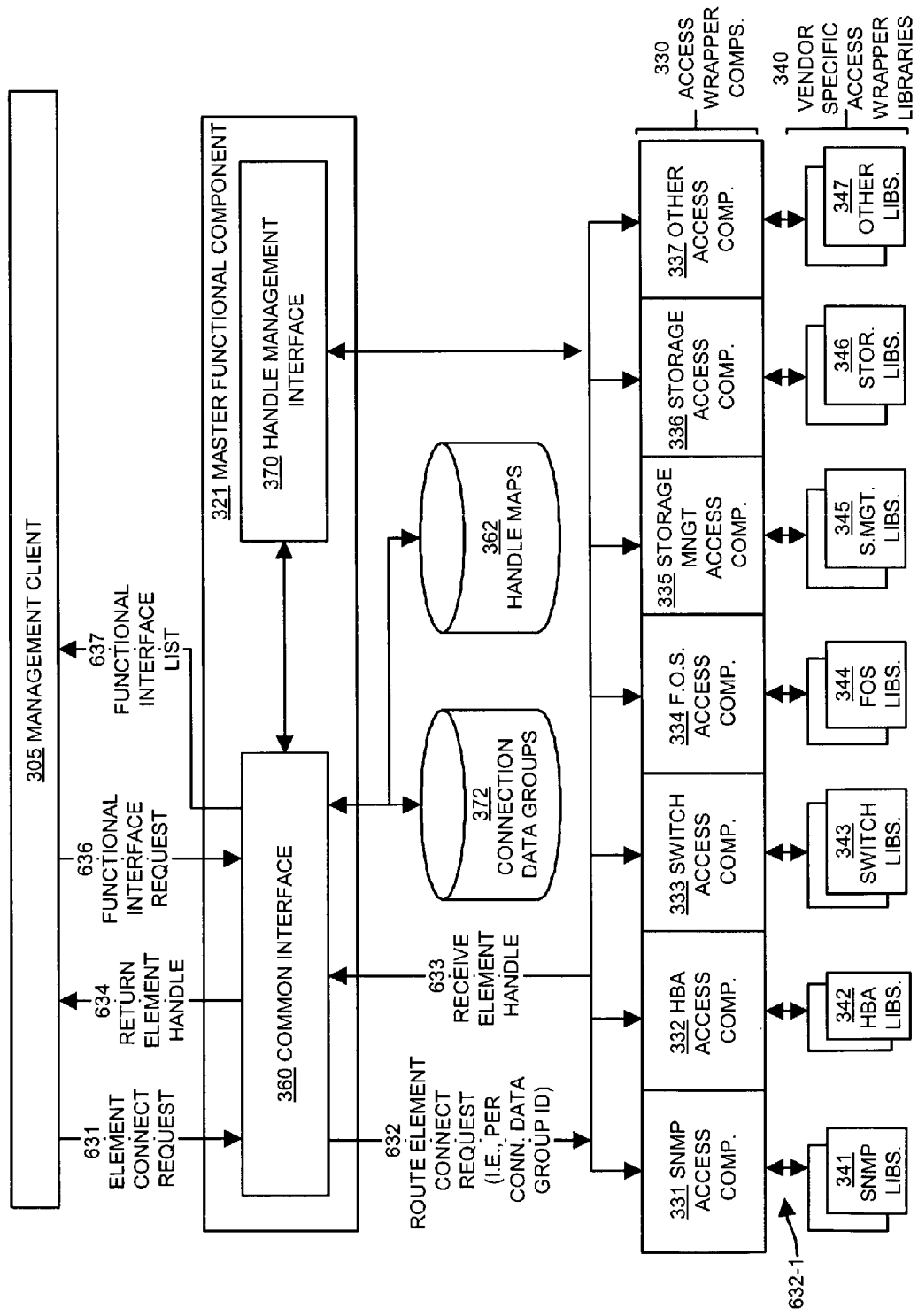
FIG. 9 illustrates operation and data flow that provide element handles and functional interfaces from the management application to a management client in accordance with one example embodiment of the invention.

FIG. 9 illustrates a data flow diagram and the general operation of the management application 300 in accordance with one embodiment of the invention to allow the management client 305 to connect to an identity of a specific element 350 operating within the storage area network 100 (e.g., to retrieve in element handle) and to request a set or list of functional interfaces that can be used to manage that element 350. The details of operation as illustrated in FIG. 9 will be explained with respect to the processing steps shown in the flow chart in FIG. 10.

Figure 10:
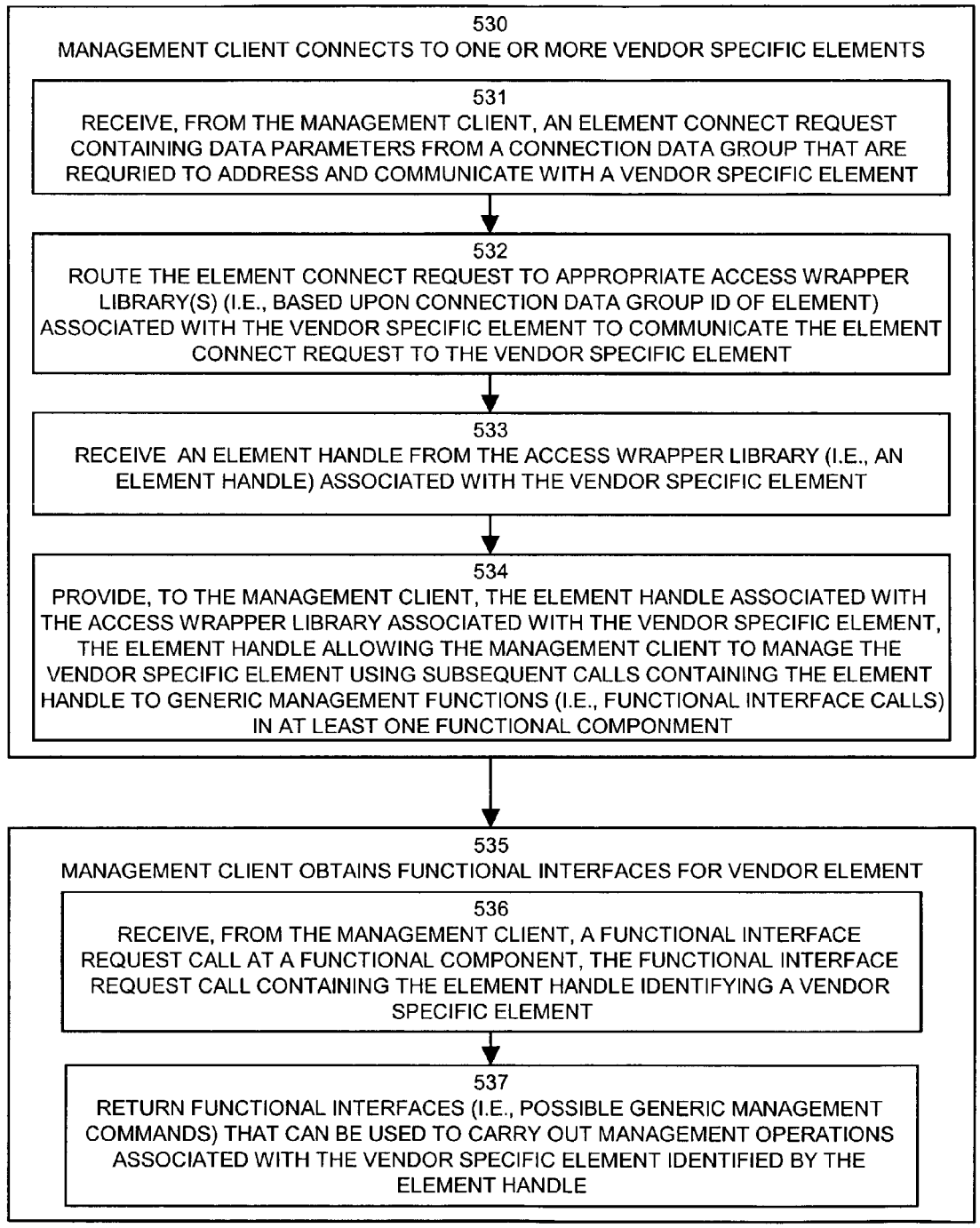
FIG. 10 is a flow chart of processing steps that show processing performed to provide element handles and functional interfaces from a management application to a management client in accordance with one example embodiment of the invention.

FIG. 10 is a flow chart of processing steps performed by the management application 300 configured in accordance with one embodiment of the invention in order to allow a management client 305 to connect to one or more vendor specific elements 350 and to obtain a list or set of functional interfaces for those vendor elements 350.

In step 530, the management application 300 allows the management client 305 to connect to one or more of the vendor specific elements 350. Details of this processing are illustrated by processing steps 531 through 534 which illustrate one example embodiment of this processing.

In step 531, the common interface 360 operating within the master functional component 321 receives, from the management client 305, an element connect request 631 (FIG. 9) containing data parameters from a connection data group 372 that are required to address and communicate with the vendor specific element 350. As noted above, the connection data may include address, user name and/or password information or any other information required to connect to a specific element 350 within the storage area network 100.

In step 532, the common interface 360 routes the element connect request 631 to an appropriate access wrapper component 330 associated with the identified vendor specific element 350 (identified by a connection data group identification or handle) in order to communicate the element connect request 632 to the appropriate vendor specific library 340 in order to connect to that element 350 associated with that library 340. In other words, in step 532, the common interface 360 forwards the element connect request 631 for receipt as call 632 by an access wrapper 330 which then routes the appropriate connect request including any required connection data to the vendor specific library 340 associated with the element 350 for which the connection data matches (e.g., based upon a connection data group identification or other information uniquely identifying the element 350). The element 350 uses the connection data to authenticate and authorize the connection and returns a "success" response to the access wrapper component 330 that invoked the operation of the shared library 340 (i.e., that made a connect call 632-1) for that element 350.

Next, in step 533, the common interface 360 receives an element handle 633 (FIG. 9) from the access wrapper 330 associated with the vendor specific element 350 to which the connection was made in step 532. The element handle received in step 533 can be compared to the handle map database 362 and the connection data groups 372 in order to confirm that the element 350 is now connected to the management client 305.

Next, in step 534, the common interface 360 provides, to the management client 305, the element handle 634 associated with the access wrapper library 340 that corresponds to the vendor specific element 350 to which that management client 305 directed the element connect request 631. The element handle 634 returned to the management client 305 allows the management client 305 to manage the vendor specific element 350 using subsequent functional interface calls containing the element handle 634. That is, functional interface call processing, which will be explained shortly in FIGS. 11 and 12, use the element handle 634 to direct the generic management functions 638 (FIG. 11) from the functional components 320 to the proper access wrapper components 330 based on element identities.

Via the processing of steps 530, the management client 305 uses connection data group information containing the identity of specific elements 350 in order to forward a connection request to those elements and in response, receives a handle if the connection was successful. At this point in processing, the management client now has access to specific references (i.e., handles) to storage area network elements 350 but is not yet aware of what generic functional interfaces 312 are allowed for management of those elements 350. This operation is explained next with respect to the processing illustrated in the flow chart in FIG. 10 beginning in step 535.

In step 535 in FIG. 10, the management client 305 obtains a list of functional interfaces for the vendor element 350 to which the connection was made in step 530. The details of the processing step 535 according to one embodiment of the invention are shown in processing steps 536 and 537.

In step 536, the base component 310 receives, from the management client 305, a functional interface request 636. The functional interface request call 636 contains the element handle 634 identifying a vendor specific element 350 for which functional interfaces are requested.

Next, in step 537, the master functional component 321 operating within the base component 310 returns a functional interface list 637 (i.e., a list of possible generic management command interfaces 312 that may be performed upon the vendor specific element 350) that can be used to carry out management operations associated with the vendor specific element 350 identified by the element handle 634.

In this manner, the processing illustrated in FIG. 10 allows the management client 305 to use the connection data to first form a connection to the vendor specific element and then allows the management client 305 to query the base component 310 to obtain a functional interface list 637 identifying management function calls 312 that the management client 305 can make to perform management of the element 350 identified by the element handle 634. The base component 310 may retrieve these interfaces via a configuration file in a predetermined manner (e.g., per functional component 320) or, alternatively, can query the access components 330 during the initialization process explained above in order to compile a list of functional interfaces of each access component 330 during their initialization sequence. At this point in processing, the management client 305 is now aware of the various functional interfaces provided by the functional components 320. Note that the management client 305 does not need to be aware of any vendor-specific functional interfaces provided by the shared vendor libraries 340 which carry out the actual management operations on the vendor specific elements 350.

Figure 11:
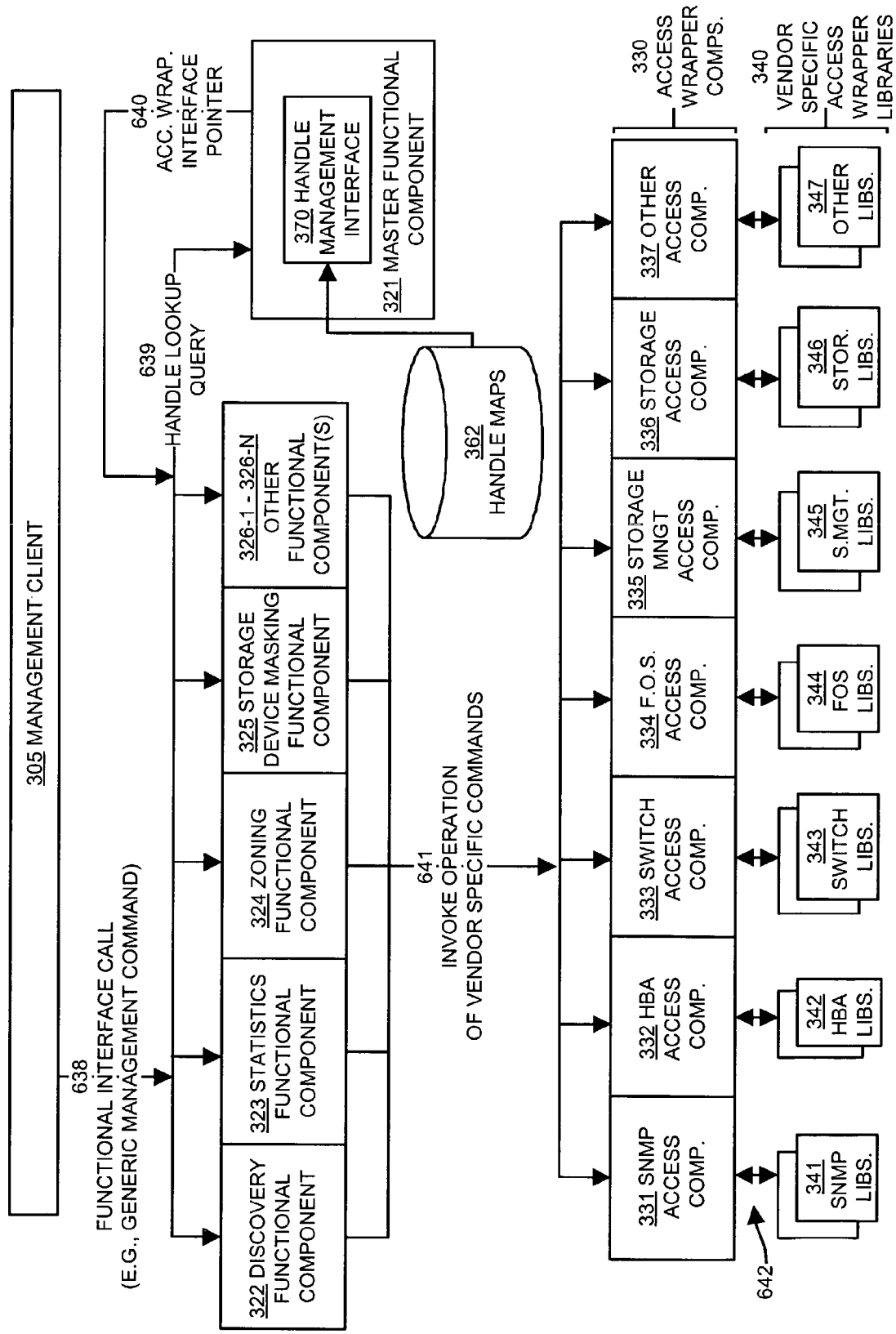
FIG. 11 illustrates operation and data flow for processing functional interface calls by a management application configured in accordance with one example embodiment of the invention.

FIG. 11 illustrates a data flow diagram of the operation of the management application 300 configured to process functional interface calls 638 from the management client 305 which the access wrapper components 330 convert or translate to vendor specific commands for operation within the vendor specific libraries 340 in order to manage and control respective vendor-specific elements 350 operating within the storage area network 100. The operation illustrated in FIG. 11 will be explained with respect to the flow chart of processing steps shown in FIG. 12.

Figure 12:
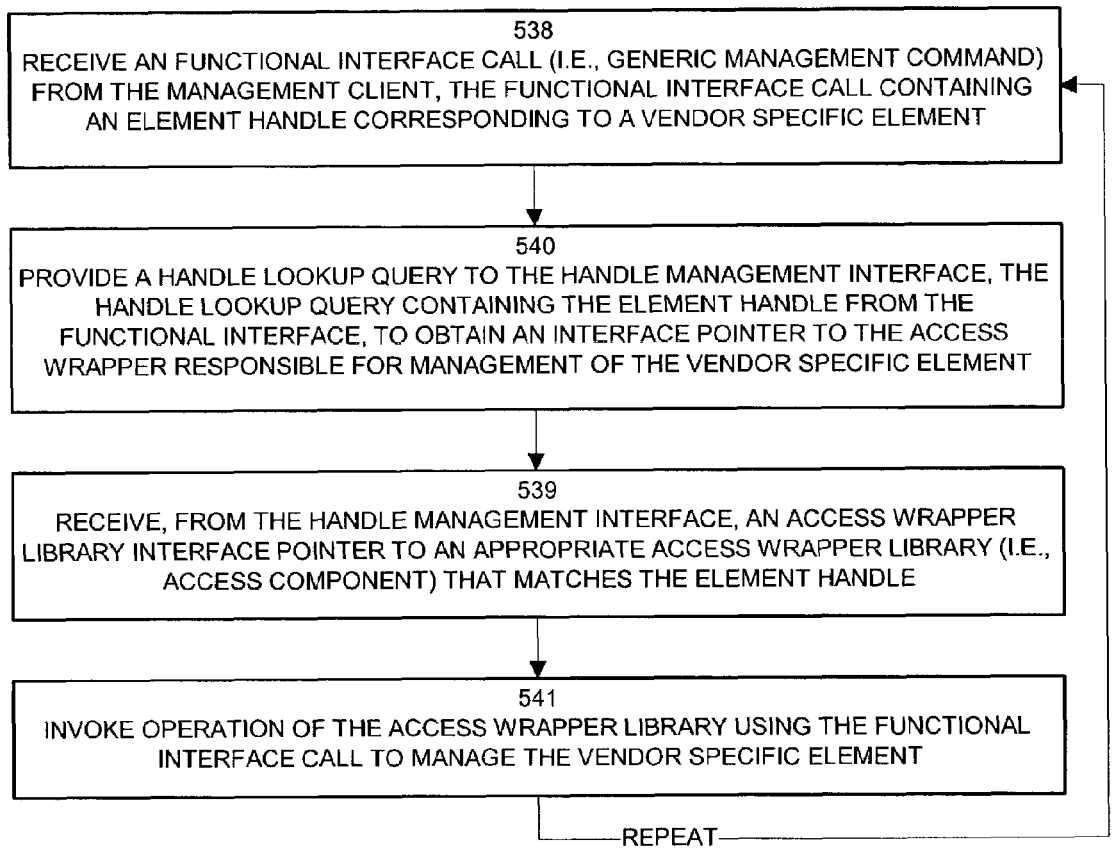
FIG. 12 is a flow chart of processing steps that show processing operations performed to process functional interface calls received from a management client by a management application configured in accordance with one example embodiment of the invention.

FIG. 12 is a flow chart of processing steps performed by the management application 300 to receive and process generic functional interface calls 638 in order to manage vendor-specific elements 350 operating within a storage area network 100 in accordance with one example embodiment of the invention.

In step 538, a functional component 320 (e.g., one of the functional components 322 through 326) receives a functional interface call 638 (i.e., the generic management command) from the management client 305. The functional interface call 638 contains an element handle corresponding to at least one vendor specific element 350. In other words, in step 538, the management client 305 places a functional interface call 638 to one of the interfaces exposed by the functional component 320. As explained above, each functional interface provided by the various functional components 320 corresponds to a generic management command that defines one or more management operations to be applied to an element 350 operating within the storage area network 100. As an example, the functional interface call 638 may be directed to the statistics functional component 323 and may specify that statistics for performance monitoring information should be gathered from a particular data storage system 150 to 156 (FIG. 1) and sent to the management client 350. The management client 305 provides, within the functional interface call, a handle identity corresponding to the particular data storage system or systems (i.e., an element handle) from which the statistical information should be collected. In addition, the functional interface call 638 can include portions of a connection data group 372 in situations where each command provided to a vendor specific element 350 requires some sort of authentication information to complete. In an alternative configuration, the processing previously discussed with respect to establishing a connection to the element (i.e., processing steps 530 to 534 in FIG. 10) establishes an authenticated connection to the element once and thereafter, no further connection data information is required for subsequent functional interface calls to generic management commands 638. Once a functional component 320 receives a functional interface call 638 containing an element handle corresponding to a vendor specific element 350, the access component performs the processing shown in step 540.

In step 540, the access component that received the functional interface call 638 provides a handle lookup query 639 to the handle management interface 370 operating within the master functional component 321. The handle lookup query 639 contains the element handle from within the functional interface call 638. The functional component 320 provides the handle lookup query 639 to the handle management interface 370 in order to obtain an access wrapper interface pointer 640 to the access wrapper component 330 responsible for management of the vendor specific element 350 to which the element handle corresponds. In other words, the generic management command specified in the functional interface call 638 can contain an element handle of an element 350 and the functional component 320 that received this call can access the handle management interface 370 in order to obtain an interface pointer to an interface within an access wrapper 330 that has loaded the appropriate vendor specific libraries 340 in order to manage and control the vendor specific element 350 corresponding to that element handle.

Next, in step 539, the functional component 320 receives, from the handle management interface 370, an access wrapper library interface pointer 640 to an appropriate access wrapper 330 that matches the element handle. Recall that during the initialization process, the handle management interface 370 developed the handle map database 362 in order to maintain a list of access component interfaces for the access components 330 for each of their respective shared vendor specific libraries 340. In this manner, the handle management interface 370 can provide, for example, an access wrapper interface pointer 640 point to the appropriate management interface of the particular access wrapper component 330 for a function within one of the vendor specific libraries 340 that manages the element 350 corresponding to the element handle received in the functional interface call 638.

Next, in step 541, the access component 320 provides a call 641 to invoke operation of the access wrapper library 340 (i.e., by calling the interface of the appropriate access rubber 330) using the functional interface call to manage the vendor specific element 350. In this manner, generic functional interface calls 638 or translated to specific access wrapper function calls 641 within the access components 330 for translation into an appropriate said a function calls 642 to the vendor specific libraries 340. The functional components 320 thus receive functional interface call requests 638 in the management client 305 and performed a lookup of the element handle using the handle management interface 370 in order to obtain an interface pointer to the appropriate access component 330. The processing of steps 538 through 541 are repeated for each functional interface call 638 received by each functional component 320. This process continuously repeats over and over as the process of managing the element 350 continues.

According to the aforementioned description of processing, embodiments of the invention are capable of providing a uniform and generic management interface to management clients 305 while insulating those clients from the details of managing specific vendor elements 350. This avoids the management clients 305 from having to interface directly with the vendor specific libraries 340 for invocation of the required vendor specific commands for management of the vendor specific elements 350.

Those skilled in the art will understand that there can be many variations made to the operations of the embodiments of the invention explained above while still achieving the same objectives of the invention. As an example, slight changes to the order of the processing steps explained above in the processing flow charts can be made while still achieving the same overall effect of the processing. Those skilled in the art of developing software applications should understand that such variations covered by the scope of this invention. As such, the foregoing description of embodiments of the invention is not intended to be limiting. Rather, any limitations to embodiments of the invention are presented in the following claims.

What is claimed is:

1. A method for managing elements in a storage area network, the method comprising the steps of:
   initializing a plurality of access wrappers, each access wrapper defining operations for management of a respective class of elements operating within the storage area network;
   providing, to a management client, connection data associated with a specific element associated with one of the plurality of access wrappers, the connection data identifying connection data parameters for performing management of the specific element in the storage area network;
   receiving at least one generic management command for the specific element, the at least one generic management command including at least a portion of the associated connection data for the specific element;
   translating the at least one generic management command into an operation of at least one vendor-specific command, including the at least a portion of the associated connection data, to manage the specific element in the storage area network; and
   wherein each access wrapper maintains a set of connection data groups, each connection data group identifying connection data parameters required to address and communicate with a respective vendor specific element associated with that access wrapper that operates in the storage area network; and
   wherein the step of providing, to a management client, connection data associated with a specific element associated with one of the plurality of access wrappers comprises the steps of:
   providing, to the management client, a respective connection data group for each element in a set of elements operating in the storage area network; and
   providing, to the management client, an interface handle to each element in the set of elements.

2. The method of claim 1 wherein the step of initializing a plurality of access wrappers comprises the steps of:
   loading a respective access wrapper library for each of the plurality of access wrappers, each access wrapper library defining a set of vendor specific interfaces operable by vendor specific commands for management of vendor specific elements defined within the respective class of components associated with the access wrapper for that access wrapper library;
   establishing an interface handle to each access wrapper library; and
   maintaining an association between the interface handle and a default interface for each access wrapper library.

3. The method of claim 2 wherein the step of initializing a plurality of access wrappers comprises the steps of:
   receiving a common interface call from the management client;
   in response to the common interface call, returning a default interface handle to the management client, the default interface handle identifying a default interface associated with a master functional component;
   receiving a default interface call to the master functional component; and
   in response to receiving the default interface call, performing the steps of loading the respective access wrapper library for each of the plurality of access wrappers, establishing an interface handle to each access wrapper library, and maintaining an association between the interface handle and a default interface for each access wrapper library.

4. The method of claim 2 wherein the step of establishing an interface handle to each access wrapper library comprises, for each access wrapper library, the steps of:
   providing, to the access wrapper library, a pointer to a handle management interface within the master functional component;
   receiving a handle registration request call to the handle management interface within the master functional component, the handle registration request call identifying a default interface associated with the access wrapper library;
   generating a unique interface handle corresponding to the access wrapper library; and
   storing an association between the unique interface handle for the access wrapper library and the default interface associated with the access wrapper library in a handle map.

5. The method of claim 2 wherein:
   the step of establishing an interface handle to each access wrapper library comprises the step of:
   operating a handle management interface to obtain at least one unique interface handle for each loaded access wrapper;
   and wherein the step of maintaining an association between the interface handle and a default interface for each access wrapper library comprises the step of:
   maintaining a handle map containing, for each loaded access wrapper, an association between the unique interface handle for that access wrapper library and a default interface associated with that access wrapper library, such that functional components within the management application can request, from the handle management interface, a pointer to the default interface of an access wrapper by specifying the interface handle for that access wrapper.

6. The method of claim 2 wherein the step of loading the access wrapper library comprises at least one of the steps of:
   i) reading an access wrapper configuration that that identifies a predetermined plurality of access wrappers for which respective access wrapper libraries are loaded; and
   ii) dynamically determining which respective access libraries to load based upon vendor-specific elements accessible within the storage area network.

7. The method of claim 1 wherein the step of providing, to a management client, connection data associated with a specific element associated with one of the plurality of access wrappers comprises the step of:
   receiving a request for connection data from the management client, the connection data enabling establishment of a respective connection with at least one element associated with the plurality of access wrappers;
   processing the request for connection data in relation to the plurality of access wrappers to determine connection data corresponding to any elements in the storage area network that are associated with the plurality of access wrappers that match the request for connection data; and
   providing, to the management client, the connection data for elements that match the request for connection data.

8. The method of claim 7 wherein the step of processing the request for connection data in relation to the plurality of access wrappers comprises the step of:

determining a set of access wrappers that define operations for management of a class of elements that match the request for connection data;

querying the matching set of access wrappers to retrieve connection data associated with each element associated with the access wrapper that corresponds with the request for connection data; and maintaining a connection data set for the retrieved connection data, the connection data set mapping the retrieved connection data for each element to an identity of that element.

9. The method of claim 8 wherein:

the request for connection data includes hint information indicating an attribute corresponding to at least one element associated with at least one access wrapper;

wherein the step of determining a set of access wrappers that define operations for management of a class of elements that match the request for connection data comprises the step of comparing the hint information to at least one access wrapper attribute for each access wrapper of the plurality of access wrappers to determine the set of matching access wrappers; and wherein the step of querying the matching set of access wrappers comprises the step of providing the hint information to a connection data query interface associated with each access wrapper to allow the connection data query interface in each access wrapper to determine the matching set of elements associated with that access wrapper that match the hint information.

10. The method of claim 9 wherein the hint information includes at least one of:

i) an element type; and ii) a vendor attribute of a vendor associated with an element.

11. The method of claim 1 wherein the step of providing, to a management client, connection data associated with a specific element associated with one of the plurality of access wrappers comprises the steps of:

providing a connection data group to a management client, the connection data group identifying connection data parameters required to address and communicate with a respective vendor specific element;

receiving, from the management client, an element connect request, the element connect request containing the data parameters from the connection data group that are required to address and communicate with the vendor specific element;

routing the element connection request to an appropriate access wrapper library associated with the vendor specific element to communicate the element connect request to the vendor specific element; and providing, to the management client, an interface handle associated with the access wrapper library associated with the vendor specific element, the interface handle allowing the management client to manage the vendor specific element using subsequent calls containing the interface handle to functions in the access wrapper library.

12. The method of claim 1 wherein the step of receiving at least one generic management command for the specific element comprises the steps of:

receiving, from the management client, an element interface request, the element interface request containing an interface handle associated with the vendor specific element;

routing the element interface request to an appropriate access wrapper library associated with the vendor specific element to retrieve a set of management interfaces associated with the vendor specific element;

receiving the set of management interfaces associated with the vendor specific element;

providing, to the management client, the set of management interfaces associated with the vendor specific element to allow the management client to manage the vendor specific element using subsequent calls to specific management interface within the set of management interfaces; and receiving, from the management client, at least one generic management command directed to at least one of the management interfaces in the set of interfaces associated with the vendor specific element.

13. The method of claim 1 wherein the step of translating the at least one generic management command into an operation of at least one vendor-specific command comprises the steps of:

receiving, at a management interface of an access wrapper associated with a vendor specific element, the at least one generic management command; and invoking operations of at least one vendor specific command implemented within at least one function associated with the management interface that received the at least one generic management command, in order to manage the vendor specific element within the storage area network.

14. A method as in claim 1, wherein receiving the at least one generic management command for the specific element includes receiving access control data required to establish a connection between the management client and the specific element for management of the specific element via the at least one generic management command.

15. A method as in claim 1, wherein translating the at least one generic management command includes translating a given generic management command into a first type of vendor-specific command and a second type of vendor-specific command, the method further comprising:

forwarding the first type of vendor-specific command to a first type of vendor specific element in the storage area network to manage the first type of vendor specific element; and forwarding the second type of vendor-specific command to a second type of vendor specific element in the storage area network to manage the second type of vendor specific element.

16. A method for managing elements in a storage area network, the method comprising the steps of:

initializing a plurality of access wrappers, each access wrapper defining operations for management of a respective class of elements operating within the storage area network;

providing, to a management client, connection data associated with a specific element associated with one of the plurality of access wrappers, the connection data identifying connection data parameters for performing management of the specific element in the storage area network;

receiving at least one generic management command for the specific element, the at least one generic management command including at least a portion of the associated connection data for the specific element; and translating the at least one generic management command into an operation of at least one vendor-specific command, including the at least a portion of the associated connection data, to manage the specific element in the storage area network;

wherein translating the at least one generic management command includes translating a given generic management command into two different types of vendor-specific commands for a purpose of managing a related set of devices including a first vendor type of device and a second vendor type of device, the related set of devices being used to convey data between hosts and storage systems of a storage area network, one of the two different types of vendor-specific commands being used to manage the first type of vendor device, another of the two different types of vendor-specific commands being used to manage the second type of vendor device.

17. A method as in claim 16, wherein translating the given generic management command into two different types of vendor-specific commands occurs as a result of the connection data in the given generic management command identifying that the given generic management command pertains to the first type of vendor device and the second type of vendor device.

18. A method for managing elements in a storage area network, the method comprising the steps of:
   initializing a plurality of access wrappers, each access wrapper defining operations for management of a respective class of elements operating within the storage area network;
   providing, to a management client, connection data associated with a specific element associated with one of the plurality of access wrappers, the connection data identifying connection data parameters for performing management of the specific element in the storage area network;
   receiving at least one generic management command for the specific element, the at least one generic management command including at least a portion of the associated connection data for the specific element; and
   translating the at least one generic management command into an operation of at least one vendor-specific command, including the at least a portion of the associated connection data, to manage the specific element in the storage area network;
   wherein receiving the at least one generic management command for the specific element includes receiving access control data required to establish a connection between the management client and the specific element for management of the specific element via the at least one generic management command, the access control data including authentication information enabling the management client to communicate with and manage the specific element via use of the at least one vendor specific command which is translated from the at least one generic management command.

19. A method as in claim 18 further comprising:
   maintaining the access control data in a repository prior to receiving the at least one generic management command; and
   upon receiving the at least one generic management command, utilizing the connection data in the at least one generic management command to identify that the at least one generic management command pertains to management of the specific element.

20. A method for managing elements in a storage area network, the method comprising the steps of:
   initializing a plurality of access wrappers, each access wrapper defining operations for management of a respective class of elements operating within the storage area network;
   providing, to a management client, connection data associated with a specific element associated with one of the plurality of access wrappers, the connection data identifying connection data parameters for performing management of the specific element in the storage area network;
   receiving at least one generic management command for the specific element, the at least one generic management command including at least a portion of the associated connection data for the specific element;
   translating the at least one generic management command into an operation of at least one vendor-specific command, including the at least a portion of the associated connection data, to manage the specific element in the storage area network;
   identifying a given access wrapper of the plurality of access wrappers to perform translation of a given generic management command;
   forwarding the given generic management command to the given access wrapper for translation to a first type of vendor-specific command and a second type of vendor-specific command; and
   on behalf of the management client:
      forwarding the first type of vendor-specific command to a first type of vendor-specific element in the storage area network to manage the first type of vendor-specific element; and
      forwarding the second type of vendor-specific command to a second type of vendor-specific element in the storage area network to manage the second type of vendor-specific element.

21. A computer program product having a computer-readable medium including computer program logic encoded thereon that when performed on a computer system provides a method for controlling management of elements within a storage area network, and wherein when the computer program logic is performed on a processor in the computer system, the computer program logic causes the processor to perform the operations of:
   initializing a plurality of access wrappers, each access wrapper defining operations for management of a respective class of elements operating within the storage area network;
   providing, to a management client, connection data associated with a specific element associated with one of the plurality of access wrappers, the connection data identifying connection data parameters for performing management of the specific element in the storage area network;
   receiving at least one generic management command for the specific element, the at least one generic management command including at least a portion of the associated connection data for the specific element; and
   translating the at least one generic management command into an operation of at least one vendor-specific command, including the at least a portion of the associated connection data, to manage the vendor specific element in the storage area network; and
   wherein each access wrapper maintains a set of connection data groups, each connection data group identifying connection data parameters required to address and communicate with a respective vendor specific element associated with that access wrapper that operates in the storage area network; and wherein the step of providing, to a management client, connection data associated with a specific element associated with one of the plurality of access wrappers comprises the steps of:

providing, to the management client, a respective connection data group for each element in a set of elements operating in the storage area network; and providing, to the management client, an interface handle to each element in the set of elements.

22. A computer system comprising:

a processor;

an application programming interface enabling communication with a storage area network containing a plurality of manageable vendor-specific elements; and an interconnection mechanism coupling the memory, the processor and the interface;

wherein the memory is encoded with instructions that form a multi-vendor management application including a plurality of functional components that each provide functional interface and that interoperate with a plurality of access wrappers; and wherein when the processor performs the multi-vendor management application, the processor forms a multi-vendor management process for managing the elements in the storage area network by performing the steps of:

initializing the plurality of access wrappers in the memory, each access wrapper defining operations for management of a respective class of elements operating within the storage area network;

providing, to a management client, connection data associated with a specific element associated with one of the plurality of access wrappers, the connection data identifying connection data parameters for performing management of the specific element in the storage area network;

receiving, from the management client, at least one generic management command for the specific element, the at least one generic management command including at least a portion of the associated connection data for the specific element; and translating the at least one generic management command into an operation of at least one vendor-specific command, including the at least a portion of the associated connection data, to manage the specific element via the interface in the storage area network;

wherein each access wrapper maintains, in the memory, a set of connection data groups, each connection data group identifying connection data parameters required to address and communicate with a respective vendor specific element associated with that access wrapper that operates in the storage area network; and wherein when the processor performs the step of providing, to a management client, connection data associated with a specific element associated with one of the plurality of access wrappers, the processor performs the steps of:

providing, to the management client, a respective connection data group for each element in a set of elements operating in the storage area network; and providing, to the management client, an interface handle to each element in the set of elements.

23. The computer system of claim 22 wherein when the processor performs the step of initializing a plurality of access wrappers, the processor performs the steps of:

loading a respective access wrapper library for each of the plurality of access wrappers into the memory, each access wrapper library defining a set of vendor specific interfaces operable by vendor specific commands for management of vendor specific elements defined within the respective class of components associated with the access wrapper for that access wrapper library;

establishing an interface handle in the memory to each access wrapper library; and maintaining an association in the memory between the interface handle and a default interface for each access wrapper library.

24. The computer system of claim 23 wherein when the processor performs the step of initializing a plurality of access wrapper, the processor performs the steps of:

receiving a common interface call from the management client;

in response to the common interface call, returning a default interface handle to the management client, the default interface handle identifying a default interface associated with a master functional component;

receiving a default interface call to the master functional component; and in response to receiving the default interface call, performing the steps of loading the respective access wrapper library for each of the plurality of access wrappers, establishing an interface handle to each access wrapper library, and maintaining an association between the interface handle and a default interface for each access wrapper library.

25. The computer system of claim 23 wherein when the processor performs the step of establishing an interface handle to each access wrapper library, the processor performs, for each access wrapper library, the steps of:

providing, to the access wrapper library in the memory, a pointer to a handle management interface within the master functional component;

receiving a handle registration request call to the handle management interface within the master functional component, the handle registration request call identifying a default interface associated with the access wrapper library;

generating, in the memory, a unique interface handle corresponding to the access wrapper library; and storing, in the memory, an association between the unique interface handle for the access wrapper library and the default interface associated with the access wrapper library in a handle map.

26. The computer system of claim 23 wherein:

when the processor performs the step of establishing an interface handle to each access wrapper library, the processor performs the step of:

operating a handle management interface to obtain at least one unique interface handle for each loaded access wrapper;

and wherein when the processor performs the step of maintaining an association between the interface handle and a default interface for each access wrapper library, the processor performs the step of:

maintaining a handle map containing, for each loaded access wrapper, an association between the unique interface handle for that access wrapper library and a default interface associated with that access wrapper library, such that functional components within the management application can request, from the handle management interface, a pointer to the default interface of an access wrapper by specifying the interface handle for that access wrapper.

27. The computer system of claim 23 wherein when the processor performs the step of loading the access wrapper library, the processor performs the steps of:
  i) reading an access wrapper configuration that identifies a predetermined plurality of access wrappers for which respective access wrapper libraries are loaded; and
  ii) dynamically determining which respective access libraries to load based upon vendor-specific elements accessible within the storage area network.

28. The computer system of claim 22 wherein when the processor performs the step of providing, to a management client, connection data associated with a specific element associated with one of the plurality of access wrappers, the processor performs the steps of:
  receiving a request for connection data from the management client, the connection data enabling establishment of a respective connection with at least one element associated with the plurality of access wrappers;
  processing the request for connection data in relation to the plurality of access wrappers to determine connection data corresponding to any elements in the storage area network that are associated with the plurality of access wrappers that match the request for connection data; and
  providing, to the management client, the connection data for elements that match the request for connection data.

29. The computer system of claim 28 wherein when the processor performs the step of processing the request for connection data in relation to the plurality of access wrappers, the processor performs the steps of:
  determining a set of access wrappers that define operations for management of a class of elements that match the request for connection data
  querying the matching set of access wrappers to retrieve connection data associated with each element associated with the access wrapper that corresponds with the request for connection data; and
  maintaining a connection data set for the retrieved connection data, the connection data set mapping the retrieved connection data for each element to an identity of that element.

30. The computer system of claim 29 wherein:
  the request for connection request includes hint information indicating an attribute corresponding to at least one element associated with at least one access wrapper;
  wherein when the processor performs the step of determining a set of access wrappers that define operations for management of a class of elements that match the request for connection data the processor performs the step of comparing the hint information to at least one access wrapper attribute for each access wrapper of the plurality of access wrappers to determine the set of matching access wrappers; and
  wherein when the processor performs the step of querying the matching set of access wrappers, the processor performs the step of providing the hint information to a connection data query interface associated with each access wrapper to allow the connection data query interface in each access wrapper to determine the matching set of elements associated with that access wrapper that match the hint information.

31. The computer system of claim 30 wherein the hint information includes at least one of:
  i) an element type; and
  ii) a vendor attribute of a vendor associated with an element.

32. The computer system of claim 22 wherein when the processor performs the step of providing, to a management client, connection data associated with a specific element associated with one of the plurality of access wrappers, the processor performs the steps of:
  providing a connection data group to a management client, the connection data group identifying connection data parameters required to address and communicate with a respective vendor specific element;
  receiving, from the management client, an element connect request, the element connect request containing the data parameters from the connection data group that are required to address and communicate with the vendor specific element;
  routing the element connection request to an appropriate access wrapper library associated with the vendor specific element to communicate the element connect request to the vendor specific element; and
  providing, to the management client, an interface handle associated with the access wrapper library associated with the vendor specific element, the interface handle allowing the management client to manage the vendor specific element using subsequent calls containing the interface handle to functions in the access wrapper library.

33. The computer system of claim 22 wherein when the processor performs the step of receiving at least one generic management command for the specific element, the processor performs the steps of:
  receiving, from the management client, an element interface request, the element interface request containing an interface handle associated with the vendor specific element;
  routing the element interface request to an appropriate access wrapper library associated with the vendor specific element to retrieve a set of management interfaces associated with the vendor specific element;
  receiving the set of management interfaces associated with the vendor specific element;
  providing, to the management client, the set of management interfaces associated with the vendor specific element to allow the management client to manage the vendor specific element using subsequent calls to specific management interface within the set of management interfaces; and
  receiving, from the management client, at least one generic management command directed to at least one of the management interfaces in the set of interfaces associated with the vendor specific element.

34. The computer system of claim 22 wherein when the processor performs the step of translating the at least one generic management command into an operation of at least one vendor-specific command, the processor performs the steps of:
  receiving, at a management interface of an access wrapper associated with a vendor specific element, the at least one generic management command; and
  invoking operations of at least one vendor specific command implemented within at least one function associated with the management interface that received the at least one generic management command, in order to manage the vendor specific element within the storage area network.

* * * * *